(12) United States Patent
Coots, III et al.

(10) Patent No.: US 12,043,526 B2
(45) Date of Patent: Jul. 23, 2024

(54) TIE PLATE SEPARATOR AND METHOD

(71) Applicant: B & B Metals, Inc., Shepherdsville, KY (US)

(72) Inventors: William R. Coots, III, Lebanon Junction, KY (US); Coty T. Coots, Shepherdsville, KY (US)

(73) Assignee: B & B Metals, Inc., Shepherdsville, KY (US)

( * ) Notice: Subject to any disclaimer, the term of this patent is extended or adjusted under 35 U.S.C. 154(b) by 298 days.

(21) Appl. No.: 16/910,906

(22) Filed: Jun. 24, 2020

(65) Prior Publication Data

US 2020/0407923 A1 Dec. 31, 2020

Related U.S. Application Data

(60) Provisional application No. 62/867,612, filed on Jun. 27, 2019, provisional application No. 62/971,585, filed on Feb. 7, 2020.

(51) Int. Cl.
| | |
|---|---|
| *B66C 23/50* | (2006.01) |
| *B25J 15/00* | (2006.01) |
| *B25J 15/06* | (2006.01) |
| *B66C 1/04* | (2006.01) |
| *B66C 1/06* | (2006.01) |
| *E01B 29/32* | (2006.01) |

(52) U.S. Cl.
CPC .......... *B66C 23/50* (2013.01); *B25J 15/0052* (2013.01); *B25J 15/0608* (2013.01); *B66C 1/04* (2013.01); *B66C 1/06* (2013.01); *E01B 29/32* (2013.01)

(58) Field of Classification Search
CPC ..... B25J 15/0052; B25J 15/0608; B66C 1/04; B66C 1/06; B66C 23/50; E01B 29/32
USPC ................ 294/65.5, 87.1; 414/736, 737, 626
See application file for complete search history.

(56) References Cited

U.S. PATENT DOCUMENTS

| | | | | |
|---|---|---|---|---|
| 505,067 | A | * | 9/1893 | Shaw ............................ 212/332 |
| 1,352,948 | A | * | 9/1920 | Fiske ............................ 414/626 |
| 1,847,451 | A | | 3/1932 | Thomas |
| 1,953,818 | A | | 4/1934 | Paridon |
| 2,341,265 | A | | 2/1944 | Crawford |
| 3,063,543 | A | | 11/1962 | Schneider |
| 3,394,808 | A | | 7/1968 | Thompson |
| 3,552,539 | A | | 1/1971 | Rutter |
| 3,589,531 | A | | 6/1971 | Polvacs |

(Continued)

FOREIGN PATENT DOCUMENTS

| | | |
|---|---|---|
| CA | 2810847 | 9/2013 |
| CA | 3085102 A1 | 12/2020 |

(Continued)

OTHER PUBLICATIONS

Canadian Intellectual Property Office, Office Action for CA Patent App. No. 2,810,688 dated Sep. 28, 2016.

(Continued)

*Primary Examiner* — James Keenan
(74) *Attorney, Agent, or Firm* — Dinsmore & Shohl LLP

(57) ABSTRACT

Present embodiments relate to an apparatus and method which separates tie plates. More specifically, and without limitation, present embodiments relate to a tie plate separator which can retrieve tie plates from a pile and separates such for placement on a feeder, such as a conveyor for sequential feeding of the tie plates.

22 Claims, 17 Drawing Sheets

(56) References Cited

U.S. PATENT DOCUMENTS

| | | | |
|---|---|---|---|
| 3,930,595 A | | 1/1976 | Formanski |
| 4,178,237 A | * | 12/1979 | Theurer .................. E01B 29/24 |
| | | | 104/307 |
| 4,377,369 A | * | 3/1983 | Johnson, Jr. ............ B66C 23/50 |
| | | | 414/809 |
| 4,583,635 A | | 4/1986 | Timmer et al. |
| 4,664,434 A | * | 5/1987 | Borst ........................ B66C 1/66 |
| | | | 53/247 |
| 4,698,775 A | * | 10/1987 | Koch ..................... B25J 19/005 |
| | | | 414/940 |
| 4,896,835 A | | 1/1990 | Fahrenholz |
| 4,974,518 A | * | 12/1990 | Cotic ..................... E01B 29/32 |
| | | | 198/395 |
| 5,037,286 A | | 8/1991 | Roberts |
| 5,038,914 A | | 8/1991 | Cotic et al. |
| 5,084,991 A | | 2/1992 | Cronk, Jr. |
| 5,165,520 A | | 11/1992 | Herve et al. |
| 5,210,999 A | | 5/1993 | Cosimati |
| 5,348,162 A | | 9/1994 | Wrobleski |
| 5,607,587 A | | 3/1997 | Langner |
| 5,913,402 A | | 6/1999 | Sakota et al. |
| 6,019,227 A | | 2/2000 | May, III |
| 6,170,401 B1 | * | 1/2001 | Miller ..................... E01B 29/09 |
| | | | 104/9 |
| 6,360,894 B1 | | 3/2002 | Devlin et al. |
| 6,564,925 B1 | | 5/2003 | Cadwallader et al. |
| 6,807,909 B1 | * | 10/2004 | Coots ..................... E01B 29/32 |
| | | | 104/16 |
| 7,150,449 B1 | * | 12/2006 | Dueck ..................... B62H 3/12 |
| | | | 414/626 |
| 7,421,952 B2 | * | 9/2008 | Taylor ..................... E01B 29/00 |
| | | | 104/2 |
| 7,497,337 B2 | | 3/2009 | Tse |
| 7,665,599 B2 | | 2/2010 | Stiibbard |
| 8,070,409 B2 | * | 12/2011 | Burke .................... B65G 47/92 |
| | | | 414/737 |
| 8,132,512 B2 | * | 3/2012 | Helmick ................ E01B 29/32 |
| | | | 104/2 |
| 8,181,799 B2 | * | 5/2012 | Laliberte ................ B66C 13/30 |
| | | | 414/626 |
| 9,016,208 B2 | | 4/2015 | Coots |
| 9,038,542 B2 | | 5/2015 | Coots |
| 9,328,465 B1 | | 5/2016 | Coots |
| 9,422,673 B2 | * | 8/2016 | Coots ..................... E01B 29/32 |
| 9,457,380 B2 | | 10/2016 | Davis |
| 11,136,726 B1 | * | 10/2021 | Coots ..................... E01B 29/32 |
| 2004/0094188 A1 | | 5/2004 | Stalp |
| 2009/0048996 A1 | | 2/2009 | Bala |
| 2009/0188406 A1 | | 7/2009 | Sperling |
| 2009/0218256 A1 | | 9/2009 | Rasmussen |
| 2011/0100248 A1 | | 5/2011 | Buckley et al. |
| 2011/0146526 A1 | | 6/2011 | Plyer et al. |

FOREIGN PATENT DOCUMENTS

| | | |
|---|---|---|
| EP | 0192594 A1 | 8/1986 |
| EP | 0895949 A1 | 10/1999 |
| EP | 0895950 A1 | 10/1999 |

OTHER PUBLICATIONS

Transmittal Letter of Related Cases.
Canadian Intellectual Property Office, Office Action for CA Patent App. No. 2,810,688 dated Jul. 17, 2017.
Canadian Intellectual Property Office, Notice of Allowance for CA Patent App. No. 2,810,688 dated Apr. 19, 2018.
Canadian Intellectual Property Office, Office Action for CA Patent App. No. 2,814,607 dated Jun. 8, 2018.
Canadian Intellectual Property Office, Notice of Allowance for CA Patent App. No. 2,814,607 dated Dec. 24, 2018.

* cited by examiner

TIE PLATE SEPARATOR AND METHOD

CLAIM TO PRIORITY

This non-provisional patent application claims priority to and benefit of, under 35 U.S.C. § 119(e), U.S. Provisional Patent Application Ser. No. 62/867,612, filed Jun. 27, 2019, titled "Tie Plate Separator and Method", and claims priority to and benefit of, under 35 U.S.C. § 119(e), U.S. Provisional Patent Application Ser. No. 62/971,585, filed Feb. 7, 2020, titled "Tie Plate Separator and Method", all of which is incorporated by reference herein.

BACKGROUND

1. Field of the Invention

Present embodiments relate to an apparatus and method which separates tie plates. More specifically, and without limitation, present embodiments relate to a tie plate separator which can retrieve tie plates from a pile and separates such for placement on a feeder, such as a conveyor for sequential feeding of the tie plates.

2. Description of the Related Art

In current tie plate distribution systems, sorting and/or separating of tie plates, including orientation of the plates, is a highly manual endeavor. Workers stand along conveyors to lift, rotate and/or orient tie plates for proper feeding location. This typically requires two men on lower output machines and as many as six men on high output or high production machines.

Due to labor costs and a desire to eliminate job functions where lifting or other injuries might occur, it would be desirable to automate as many of these labor positions as possible.

Additionally, it would be desirable to increase the throughput of tie plates to increase efficiencies associated with distribution and therefore decrease the downtime of railroad tracks during maintenance periods when tie plate replacement is necessary.

The information included in this Background section of the specification, including any references cited herein and any description or discussion thereof, is included for technical reference purposes only and is not to be regarded subject matter by which the scope of the invention is to be bound.

SUMMARY

The present application discloses one or more of the features recited in the appended claims and/or the following features which alone or in any combination, may comprise patentable subject matter.

The present embodiments provide a tie plate separator which is able to engage a pile of tie plates and pick a plurality of tie plates in separated fashion at one time from the pile. The separator then is capable of moving the tie plates to a conveyor and placing the tie plates on the conveyor in a separated fashion so that the tie plates may be moved to a desired position.

More specifically, present embodiments provide a tie plate separator comprising a bar having a plurality of magnets spaced along a longitudinal direction of the bar. The magnets having at least one cooperating circuit which allows for selective release of tie plates from the magnets. A support structure extends from the bar and is capable of being grasped for movement of the bar.

In optional embodiments, the magnets may be electromagnetic and the circuit may be electrical. Alternatively, the magnets may be permanent magnets. The circuit is one of hydraulic or pneumatic and actuates to remove each of the plates from each of the magnets.

In further embodiments, a tie plate separator may comprise a bar having a plurality of spaced connectors depending from the bar, a plurality of magnets, each of the magnets corresponding to one of the plurality of spaced connectors. A support structure may extend from the bar and is capable of being grasped. An electrical conduit may extend to each of the magnets for selective powering on or off of said magnets.

Optionally, the connectors may be chains or a cable. The magnets may be spaced apart a distance equal to or greater than a long dimension of a tie plate. The tie plate separator may further comprise at least one power circuit for powering the plurality of magnets. The tie plate separator may have a first power circuit and a second power circuit. The first portion of the magnets may be operably connected to the first power circuit and a second portion of the magnets is operably connected to the second power circuit. The bar may be sized to fit within a gondola car.

In some embodiments, a method of sorting tie plates comprises, grasping a bar with a utility vehicle, activating a plurality of magnets depending from the bar, picking a plurality of tie plates with at least some of the plurality of magnets, moving the bar to a conveyor aligning the bar with the conveyor, and releasing the tie plates from the at least some of the plurality of magnets.

Optionally, the method may further comprise powering on and off all of the magnets, the powering on and off a first portion of the magnets and a second portion of the magnets, independently.

According to some embodiments, a gantry crane may comprise a rail vehicle, a first support and a second support connected to the rail vehicle, a bar supported at a first end by the first support and at a second end by the second support, a plurality of magnets disposed along a lower surface of the bar, the bar movable through a first dimension, the bar movable laterally along the first support and the second support through a second dimension perpendicular to the first dimension.

According to some optional embodiments, the rail vehicle may be self-powered or being towable. The first support and the second support each having a fluid powered arm to raise and lower each support and the bar. The first support and the second support may each have a trolley to move the bar through the second dimension. The first support and the second support may each have a hoist to raise and lower the bar. The first support and the second support may each have a trolley to move the bar through the second dimension. The first support and the second support may each have one or both of a cable or an anti-sway post.

According to some embodiments, a gantry crane may comprise a rail vehicle, a first support and a second support spaced from the first support, the first support and the second support being mounted to the rail vehicle, a first hoist moveable along the first support and a second hoist movable along the second support, a bar supported by the first hoist and the second hoist, the bar being movable vertically by the hoists and laterally by the hoists, the bar having a plurality of spaced apart magnets to selectively retain, move, and release tie plates, a conveyor disposed adjacent to the supports to receive the tie plates from the bar with the magnets.

In some optional embodiments, the gantry crane may further comprising a storage area for the plurality of tie plates to be retrieved. The storage area may be disposed adjacent to the conveyor. The storage area may be two storage areas. The gantry crane of the rail vehicle may be self-propelled or towable. The rail vehicle may be a hi-rail vehicle. The rail vehicle may be a rail car. The first support may comprise two columns and a cross bar. The second support may comprise two columns and a cross bar.

According to some embodiments, a method of separating tie plates may comprise the steps of lowering a tie plate bar into a tie plate storage container, powering on a magnet circuit to power on a plurality of magnets and retaining a plurality of tie plates, moving, with a hoist, the tie plate bar over a conveyor, un-powering the magnets and releasing the tie plates on to the conveyor.

According to some optional steps, the method may further comprise moving the tie plate bar to the storage area. Optionally, the method may further comprise moving the released tie plates to a tie plate dispenser along said conveyor. The method may further comprise sorting the tie plates singularly on the conveyor.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. All of the above outlined features are to be understood as exemplary only and many more features and objectives of the various embodiments may be gleaned from the disclosure herein. Therefore, no limiting interpretation of this summary is to be understood without further reading of the entire specification, claims and drawings, included herewith. A more extensive presentation of features, details, utilities, and advantages of the present invention is provided in the following written description of various embodiments of the invention, illustrated in the accompanying drawings, and defined in the appended claims.

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

BRIEF DESCRIPTION OF THE DRAWINGS

In order that the embodiments may be better understood, embodiments of a tie plate separator and method will now be described by way of examples. These embodiments are not to limit the scope of the claims as other embodiments of a tie plate separator will become apparent to one having ordinary skill in the art upon reading the instant description. Non-limiting examples of the present embodiments are shown in figures wherein:

DETAILED DESCRIPTION

Figure 1:
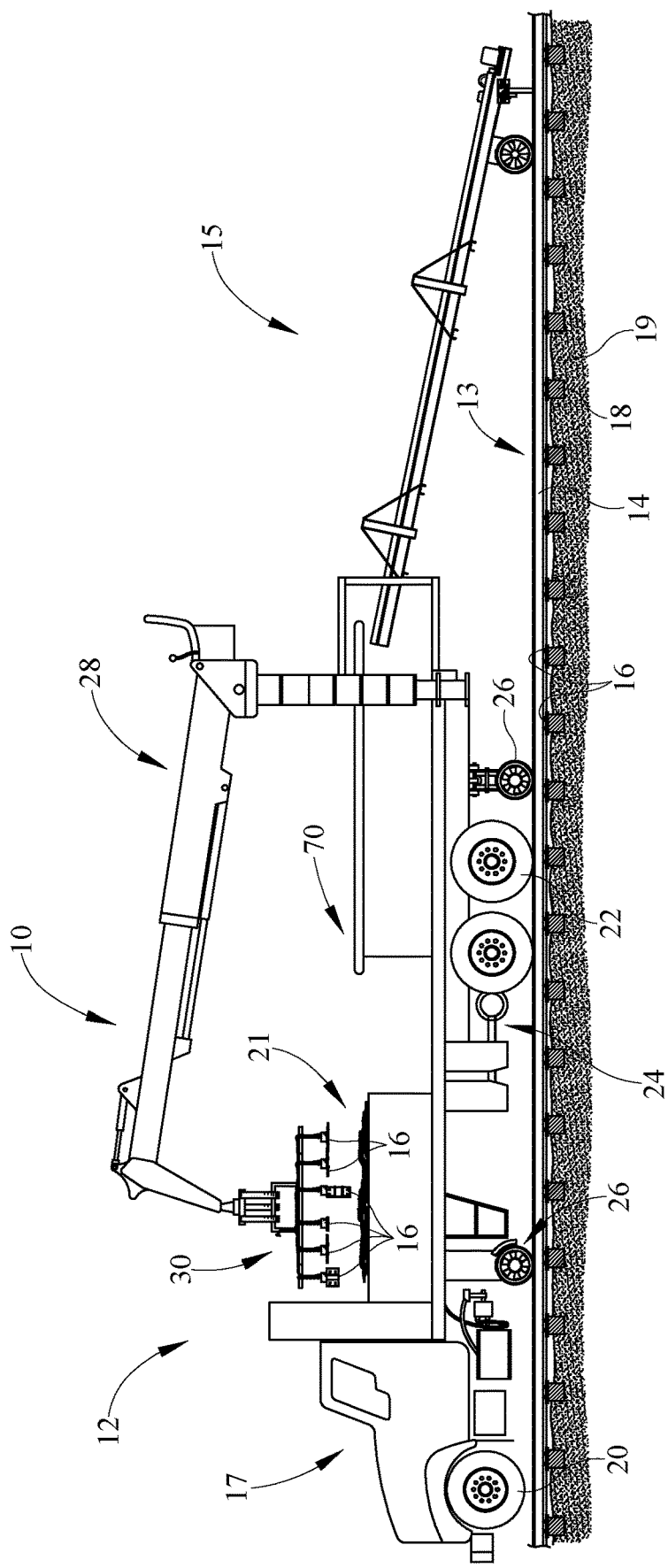
FIG. 1 is a side view of one embodiment of a tie plate distribution system and conveyor.

It is to be understood that the tie plate separator is not limited in its application to the details of construction and the arrangement of components set forth in the following description or illustrated in the drawings. The described embodiments are capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Referring now to FIGS. 1-17, depict a tie plate separator which is able to engage a pile of tie plates and pull individual tie plates from the pile. Upon engagement and picking of these tie plates, the separator then moves from the location of the pile to a second location where a conveyor may be located. The separator may then deposit the tie plates onto the conveyor and allow for discharge and positioning on the conveyor so that the tie plates are separated and sequentially arranged on the conveyor for movement to a subsequent location for processing.

Referring initially to FIG. 1, a side view of a tie plate separator system 10 positioned on a hi-rail truck 12 for separating a plurality of tie plates positioned on the truck by a crane 28 or other loading structure and feeding a tie plate distribution system 15.

The tie plate separator system 10 is mounted on a truck 12 or other vehicle having capability of operating on a road or on a railroad track 13, as shown. The railroad track 13 includes a pair of rails 14 disposed on tie plates 16. The tie plates 16 are positioned on the railroad ties 18 which extend generally perpendicular below the rails 14. The tie plates 16 connect the rails 14 to the railroad ties 18. The railroad ties 18 are positioned in ballast 19 which may be formed of various substrates which typically include some amount of gravel or rock. These materials are not to be considered limiting or exhaustive.

The truck 12 includes the front road tires 20 and at least one set of rear road tires 22. An engine and transmission connected to the rear road tires 22 provide propulsion for both on road and railway travel, according to the instant embodiment. The truck 12 or other vehicle may also include rail wheels 26 which allow movement along rails 14 by way of propulsion from at least one of the front and rear tires 20 and 22. The truck 12 may include an auxiliary drive system 24 which also allows the vehicle to operate on the railroad tracks through the use of additional rail wheels 26 shown. The truck 12 or other vehicle may operate on the railroad track having maintenance performed or a railroad track adjacent to the railroad track having maintenance performed.

At a forward end of the truck 12 is the operating cab 17 wherein a driver can operate the truck 12 while in use during on road travel, and in order to position the truck 12 on the railroad track 13. Once the truck 12 is positioned on the track 13, the operator may move to a rear or cab area where the engine speed, auxiliary drive 24 and crane 28 may be controlled in order to propel the truck along the rails 14 and move tie plates 16 for processing in the separator 30. Such rear or cab area may or may not be enclosed.

The crane 28 is located at the rear of the bed of the truck 12 for loading materials onto the truck 12 as well as clearing debris from railway worksites as needed. The crane 28 may be articulating and/or extendable. The truck 12 may also include a hopper located on the bed for storage of a plurality of tie plates. In some embodiments, however, the tie plates may be stored in a pile on the bed of the vehicle 12, or other described herein.

Figure 2:
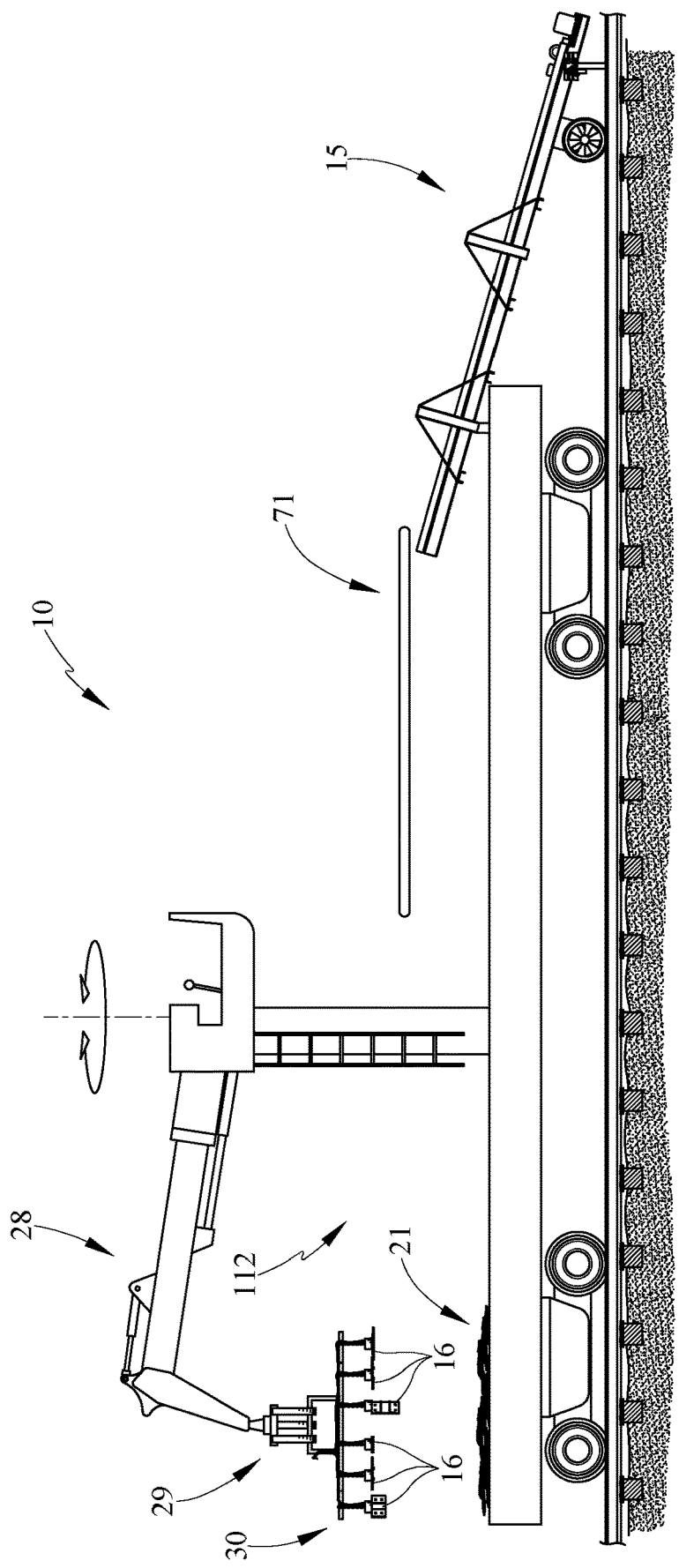
FIG. 2 is a side view of an alternate embodiment using a flatbed railcar.

With reference to FIG. 2, an alternative vehicle 112 is depicted. The vehicle 112 is a flatbed cargo vehicle for railroad track 13 usage. The vehicle 112 is, in some embodiments, used for higher output tie plate production systems. In operation, vehicle 112 may follow behind vehicle 12, or other pulling vehicle, engine or tractor, so as to receive tie plates 16 from crane 28. These vehicles 12, 112 should not be considered limiting as various types of vehicles may be utilized. In other embodiments and with reference to FIG. 3, the vehicle may also be a gondola car 212 which may walls 220 and an open top, and may store a plurality of tie plates therein. The crane 28 may be located on the flatbed vehicle 112 or the truck 12 either of which may be adjacent to the gondola car 212. In a further embodiment, the crane or boom may be disposed on the gondola car 212. In still further embodiments, the gondola car 212 may also utilize a utility vehicle 280 such as an excavator for non-limiting example, which operates on the upper edges of the gondola car walls 220, to retrieve the tie plates. The gondola car 212 may be trailed by a tie plate distribution system 15.

In any embodiments, the crane, excavator, or other vehicle, any of which may be generally referred to as a utility vehicle, may have an arm which is extendable, rotatable, and/or articulating in order to provide functionality associated with the present embodiments.

In some embodiments, it may be desirable for high output systems to combine the gondola car 212 utility vehicle 280 with and a trailing, connected flat rail car 112 (FIG. 2). In such arrangement, the utility vehicle may dump the tip plates 16 onto the conveyor 71, which may be lengthened. In such arrangement, the crane 28 of FIG. 2 may not be needed as the utility vehicle can position the tie plates 16 directly onto the lengthened conveyor 71.

Figure 3:
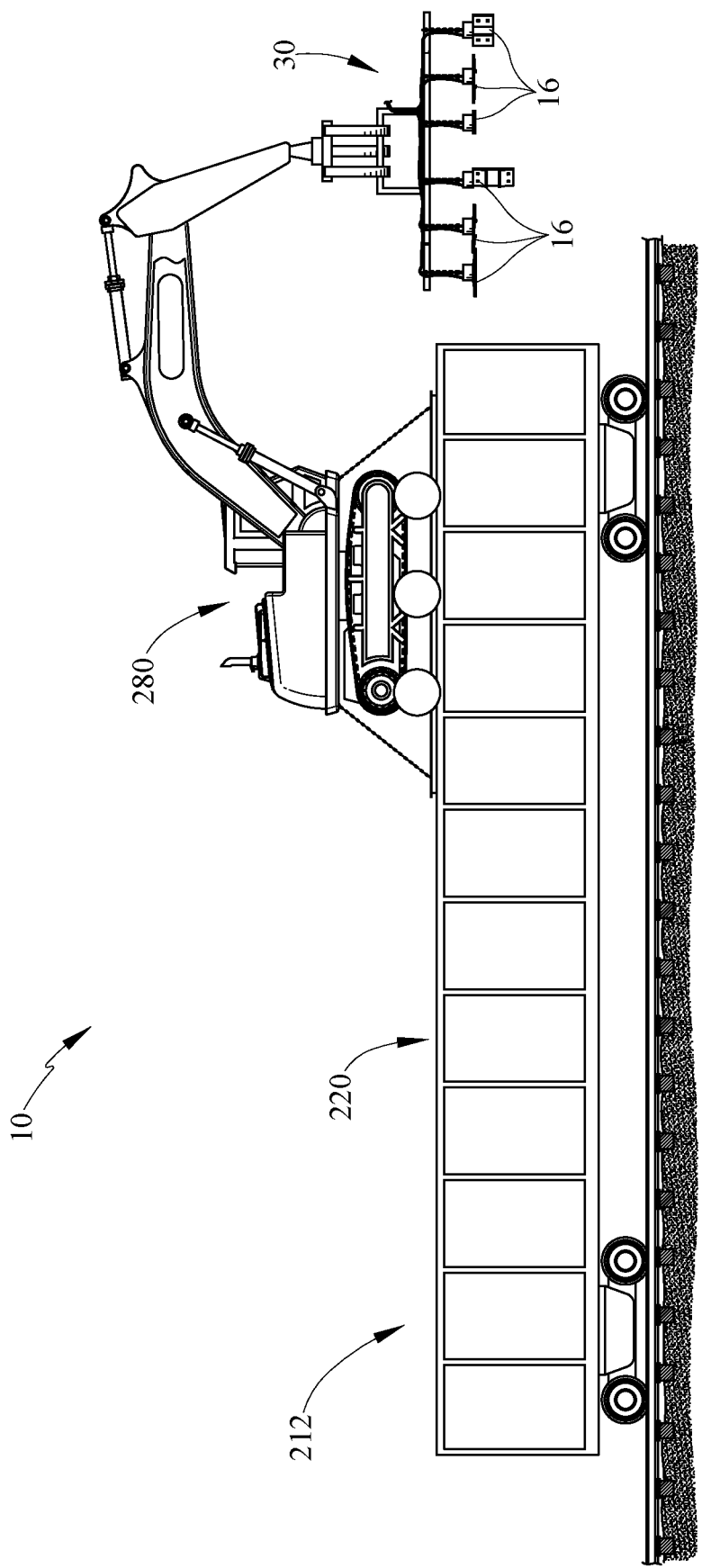
FIG. 3 is a side view of a further embodiment having a gondola car and a utility vehicle.

Referring to any of FIGS. 1-3, the tie plate separator system 10 of the instant embodiments retrieves the tie plates from a first location of the vehicles 12, 112, or 212 and moves the tie plates to a second location for depositing on or toward a tie plate distribution system 15. In any of these embodiments, the tie plate separator 30 operates around or near a pile 21 of tie plates 16. This may be in a gondola car, on a flat surface of the truck 12 or on the bed of the flat railcar 112. Other locations for the pile 21 of tie plates 16 may vary depending on the arrangement of tracks and the maintenance work being performed. However, the separator 30 is shown retained by the crane 28 or utility vehicle 280. Other structures may be utilized, for example, having a crane arm, boom, or the like thereon. In any of these embodiments, a grappler 29 or other grasping structure may be provided on the crane 28 and such grappler 29, for example, may be utilized to grasp and move the tie plate separator 30.

Figure 4:
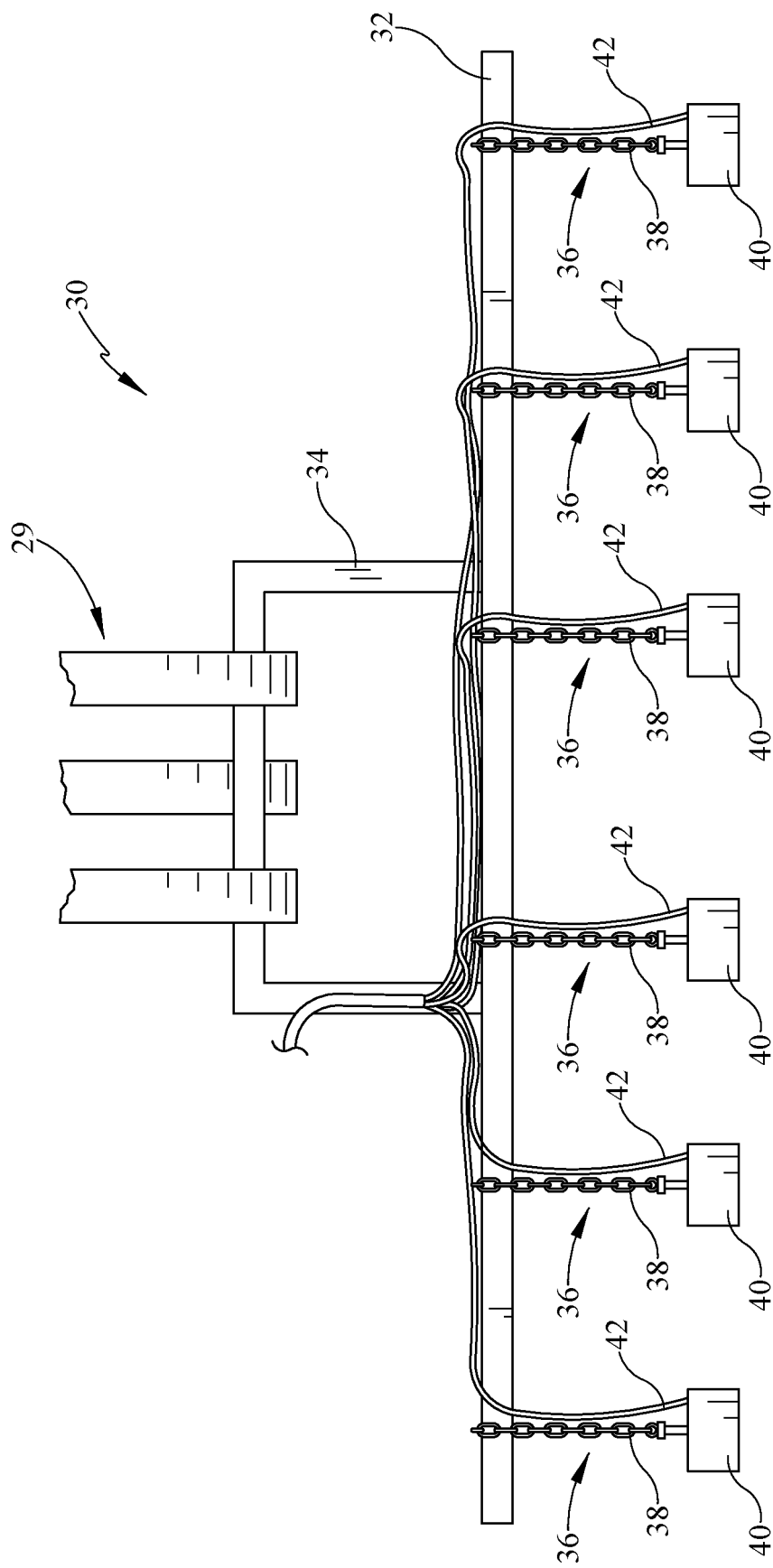
FIG. 4 is a side view of an embodiment of the tie plate separator.

With additional reference now to FIG. 4, a first view of a separator 30 is shown in side view. The separator 30 comprises a bar 32 which extends longitudinally. The bar 32 may be formed of various materials that have various cross sections. According to the instant embodiment, the bar 32 may be a closed cross-sectional shape such as a square or rectangular, for non-limiting example. The bar 32 may be of high strength material due to the weight of the sum of tie plates 16 (FIG. 1) being lifted as well as other retaining structures which are depending from the bar 32.

Extending from an upper side of the bar 32 is a support structure 34. According to the instant embodiment, the support structure 34 may be generally C-shaped so as to provide an aperture between the bar 32 and the upper end of the support structure 34 wherein a grappler structure or other grasping device may be positioned for clearance. Various structures may be utilized in order to grasp the bar 32. The support structure 34 may also be rigid and capable to withstand the gripping force necessary for holding the bar 32 and the supported magnets and tie plates therefrom. Of course, other designs may be utilized for the support structure and the C-shaped structure should not be considered limiting.

One factor is determining a desirable support structure 34 may be the type of grasping device on the crane, boom or utility vehicle. It may also be desirable to limit twisting of the bar 32. Accordingly, a wider grasping device and/or support structure 34 may be utilized in some embodiments in order to limit twisting, for example associated with inertia. The support structure 34 may be sized to support such function and gripping by a grappler 29 or other grasping or retaining device.

A plurality of connectors 36 are also shown depending from the bar 32. The connectors 36 may be defined by various structures including cables, chains, ropes, and the like. Due to the nature of the materials used in the railroad industry and the wear and tear associated with maintenance work, it may be desirable in some embodiments that the connectors 36 be formed of chains which are more likely to withstand the rugged environment associated with this type or work. The chains 38 are depicted as being wrapped around the bar 32. In other embodiments, the chains 38 may be connected by fasteners or other ways of connection.

The connectors 36 depend a preselected length from the bar 32 in order to provide some clearance from the bar and eliminate the need to drop the bar 32 all the way to touch the pile of tie plates in order to pick the tie plates by the separator. Instead, the plurality of connectors 36 allows for variation or inconsistency of plane of the uneven pile 21 of tie plates 16 (FIG. 1). Further the length of the connectors 36 also eliminates some distance of movement of the grappler 29 and the bar 32 during each pick of the tie plates.

The connectors 36 are also spaced apart along the bar 32 in the longitudinal direction of the bar 32. The spacing may be dependent upon various factors including, but not limited to, the length of bar 32, the number of tie plates 16 desired for pick up, the size of individual tie plates, the number of magnets, number of electrical circuits (described further herein), and other factors.

Depending from the bar 32 and each chain 38 has a magnet 40. The magnets may selectively retain or release tie plates and the magnets 40 may be of various forms, such as for non-limiting example electromagnetic or permanent magnet. The number of magnets 40 may be dependent upon the number of tie plates desired for pick up and the length of the bar 32. The connectors 36 and the magnets 40 are spaced apart some distance in order eliminate contact which may jolt the tie plates loose from the magnets 40. For example, the magnets 40 and connectors 36 may be spaced apart a distance which is greater than a dimensional length of the tie plates in order to eliminate contact between them as they are hanging from the magnets 40. The dimensional length may be in a longitudinal direction or a latitudinal direction. However, various distances may be utilized and this is non-limiting and merely illustrative.

According to some embodiments, each of the magnets 40 may be an electromagnet which allows for selective powering on and powering off in order to pick and release or dispose of the tie plates, respectively. The magnets 40 may be powered by a single circuit or may be powered by two circuits. As will be discussed later, this has relationship with the duty cycle of the magnets 40 and the cooling time needed for the magnets 40 to operate properly at a desired magnetic force level. Accordingly, more than one circuit may also be used so that in some embodiments a first circuit may be powered on and off and while the first circuit of magnets is cooling a second circuit of magnets is powered on. These circuits may be alternated in order to increase the work speed and without decreasing the retaining force of the magnets.

Figure 5:
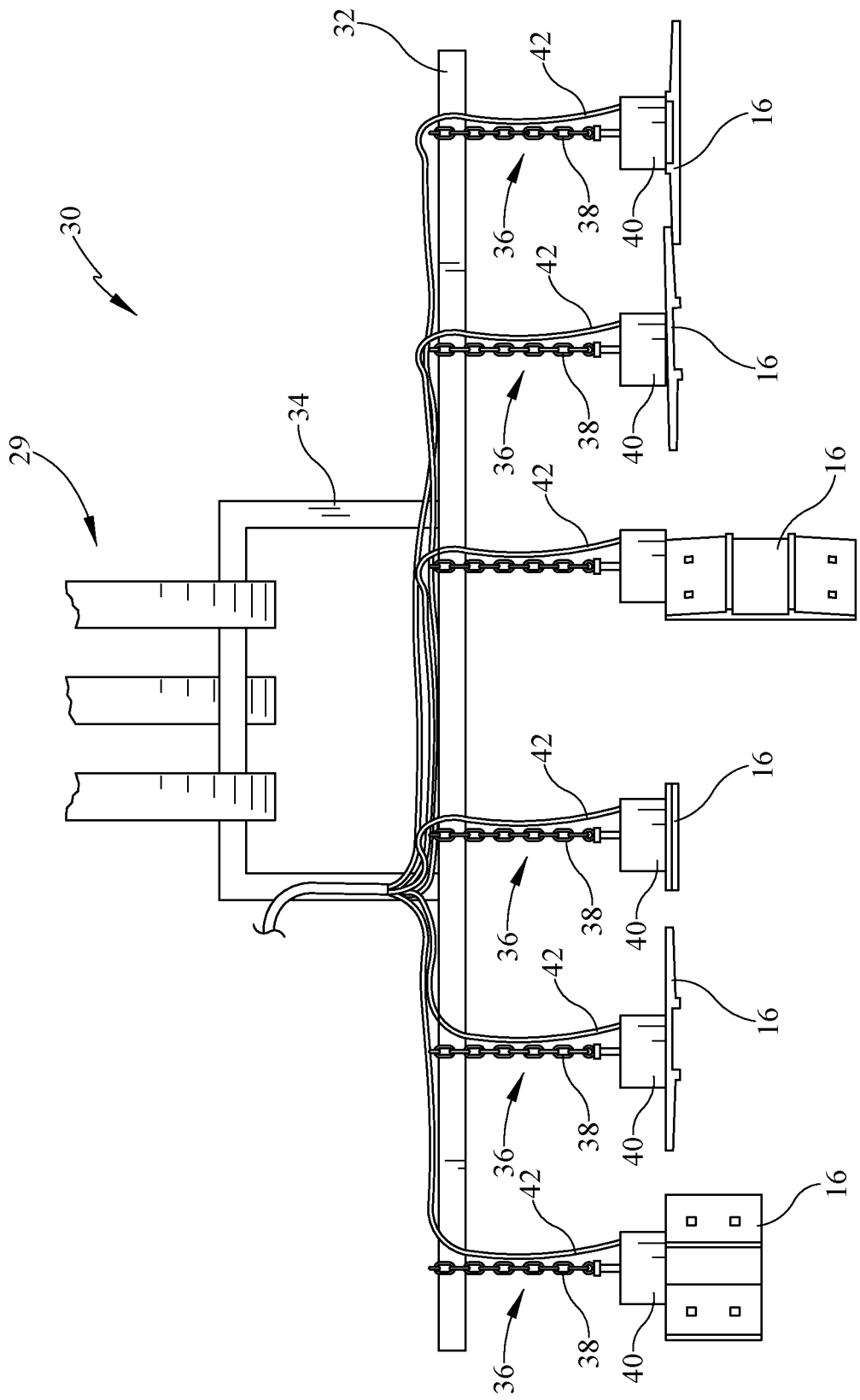
FIG. 5 is a side view of the separator of FIG. 4, with a plurality of tie plates connected thereto.

Referring now to FIG. 5, a side view of the separator 30 is shown. In this view, the separator 30 is shown retaining a plurality of tie plates 16. As shown in the figure, tie plates 16 may be grasped on flat surfaces. Additionally, or alternatively, the tie plates 16 may not always be cleanly grasped on a surface, but instead may be grasped along an edge such that the surface area associated with the retaining force is limited. Accordingly, the magnet 40 may have a retaining force which is much greater than that of the weight of any single tie plate. Additionally, as tie plates are often wedged or engaging one another in a pile, or still further, bang into one another during lifting or movement, it may be necessary to provide additional magnet force in order to overcome these operating characteristics.

With reference to each of FIGS. 4-5, a plurality of electrical conduits 42 are shown extending along the bar 32 and to each of the magnets 40. The conduits 42 provide power and/or a control signal to the magnets 40 to power on and power off. By powering these off and on, the tie plates 16 may be released or retained, respectively.

Figure 6:
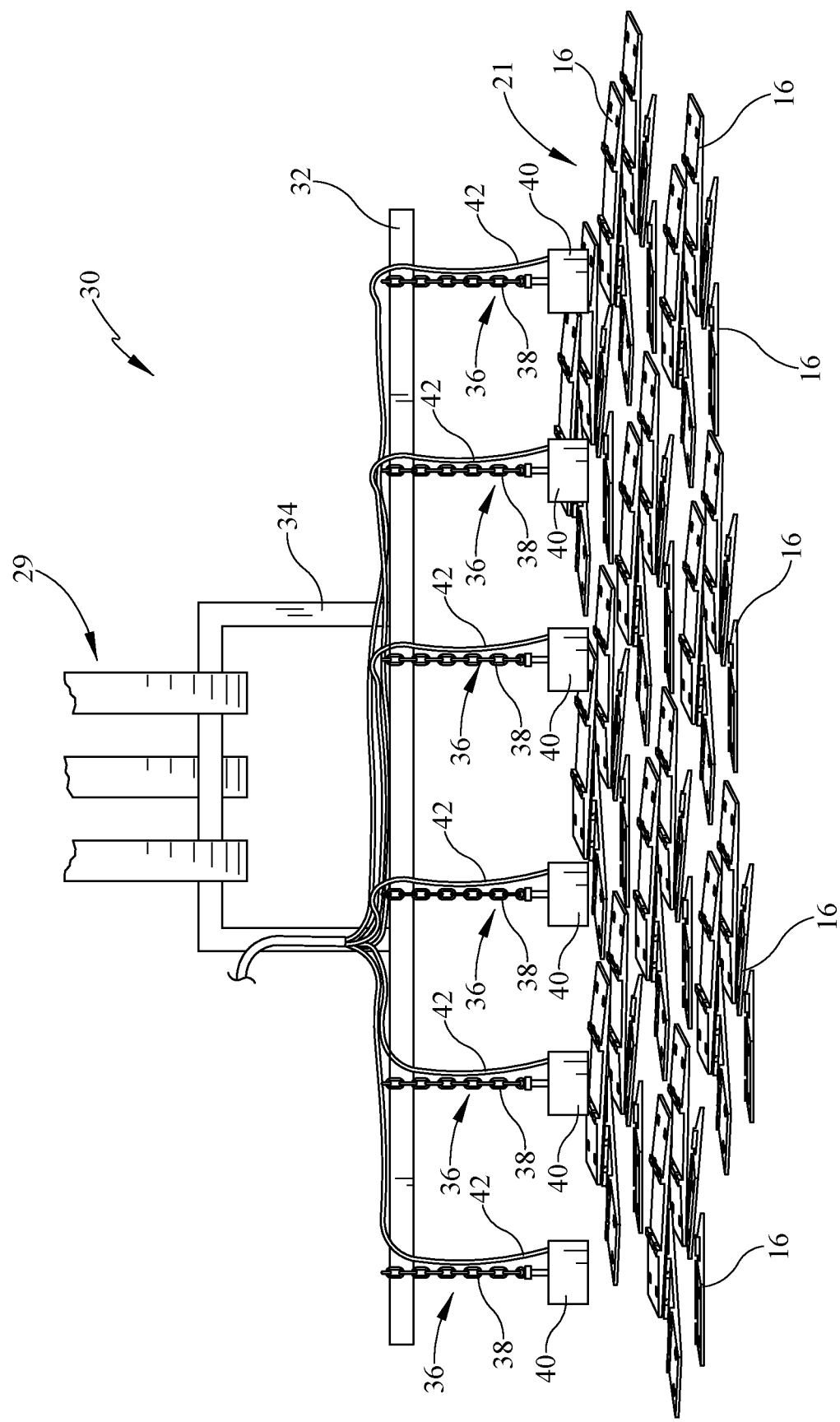
FIG. 6 is a first sequence view of a utility vehicle utilizing the tie plate separator to pick a plurality of tie plates from a rail car.
Figure 7:
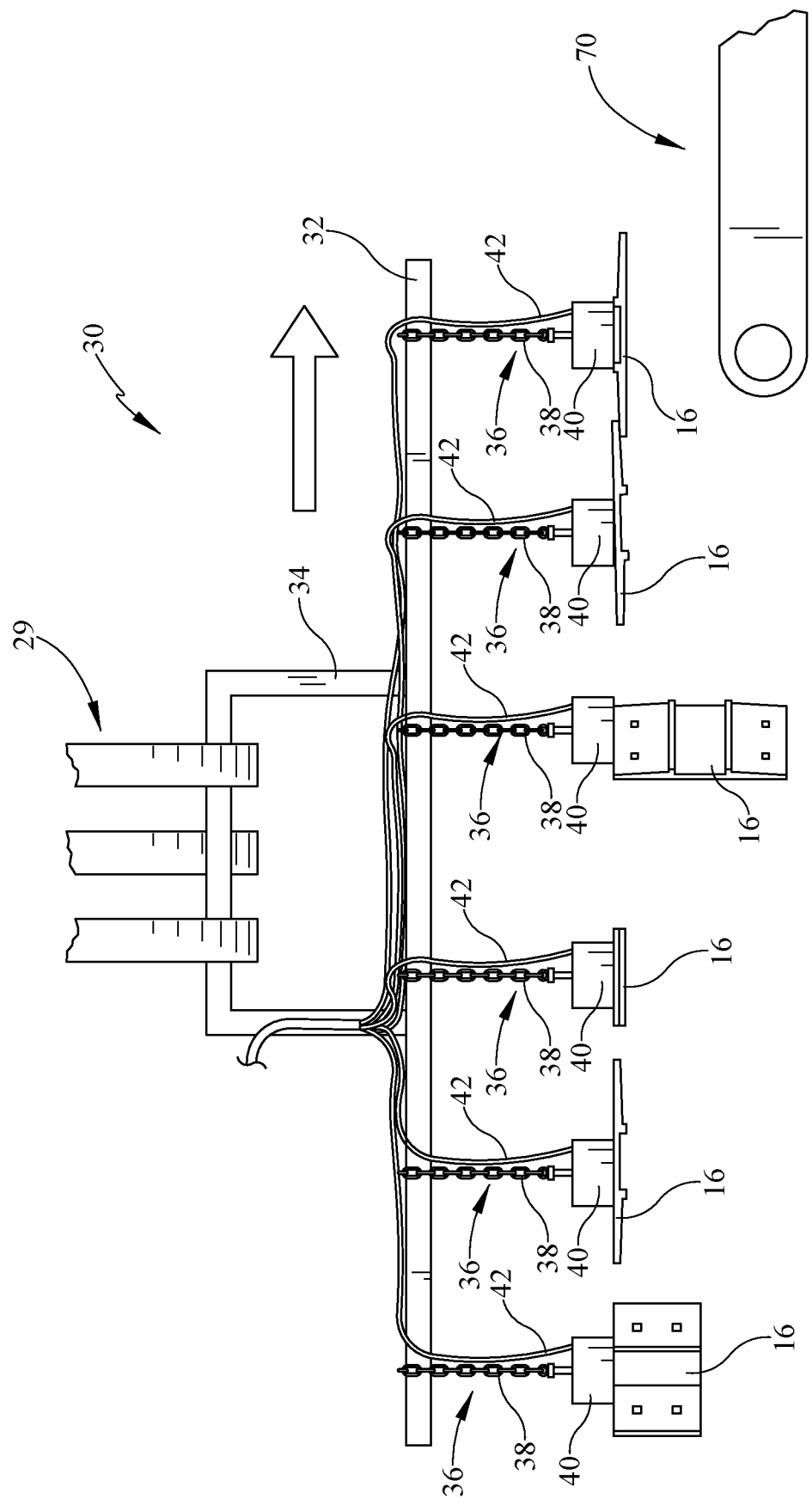
FIG. 7 is a second sequence view of the tie plate separator being utilized to move the tie plates toward a conveyor.
Figure 8:
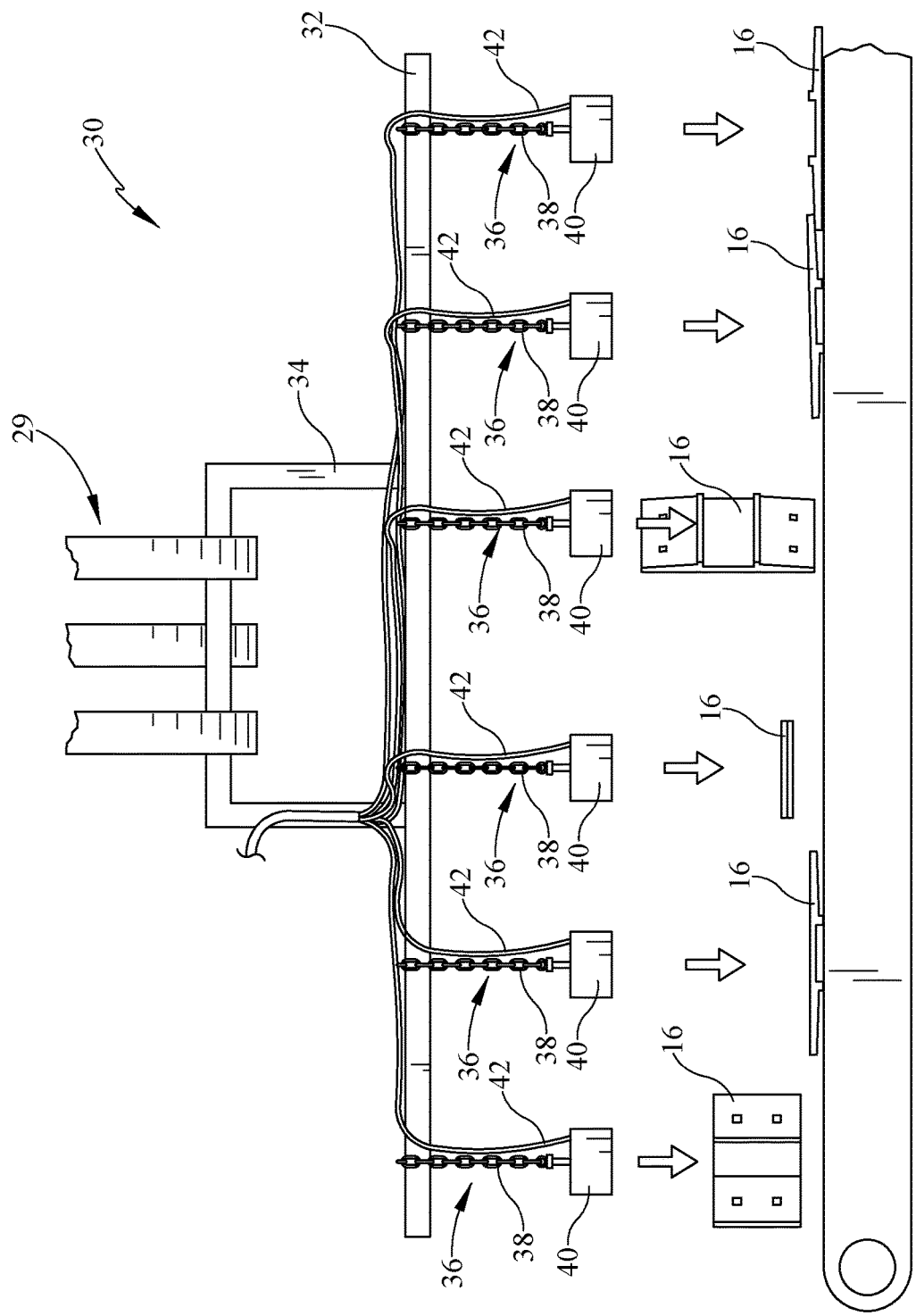
FIG. 8 is a third sequence view of the tie plate separator disposing the picked tie plates onto the conveyor.

Referring now to FIGS. 6-8, a first sequence view of the tie plate separator 30 is depicted in operation. With reference first to FIG. 6, the utility vehicle comprising the grappler 29 is grasping the separator 30 and positioning the separator 30 at a pile of tie plates. The at least one magnetic power circuit is powered on so that the magnets have a retaining force and any tie plates engaging or nearly engaging the magnets may be picked from the pile. As the separator 30 is moved away from the pile, the tie plates 16 are individually and separately retained by the magnets 40 and pulled from the pile 21.

With reference now to FIG. 7, the separator 30 continues to move away from the pile 21 and toward a conveyor 70. It should be noted that the term "conveyor" is utilized and is illustrative and not limiting of a traditional belt or roller conveyor but may be various forms of mover devices. For example, the term conveyors may be but is not limited to, roller conveyors, chutes, gravity feeders, vibratory feeders, or any other device or mechanism capable of conveying the tie plates from a first position to a second position. The shape of the bar 32, as previously described, may be linear. Thus the grasping structure 29 may be rotated or pivoted so that the bar 32 is in alignment in a longitudinal direction of a conveyor. That is, the longitudinal direction of the bar 32 and therefore the positioning of the plates 16 picked from the pile 21 (FIG. 6), may be in longitudinal alignment. Once the bar 32 is aligned with the conveyor 70 in a position above the conveyor, the at least one power circuit may be deactivated so that the tie plates are disposed on the conveyor. The alignment may not be exact and may vary some number of degrees, but it should be understood that the bar 32 is positioned so as to deposit the tie plates on the conveyor 70.

With reference to FIG. 8, this action has occurred and the tie plates 16 are being deposited on the conveyor 70 for movement, for non-limiting example, a belt conveyor. Further, the tie plates 16 may be spaced apart on the conveyor 70 so as to be separated and allow for flipping of the tie plates 16 from a first side to a second side, if needed. Additionally and alternatively, it may be desirable to spin the tie plates 16 about a vertical axis, for example, to also orient the tie plates to a desired position or orientation. Either of these may be performed manually or in automated fashion for subsequent delivery to the tie plate distribution system 15.

Figure 9:
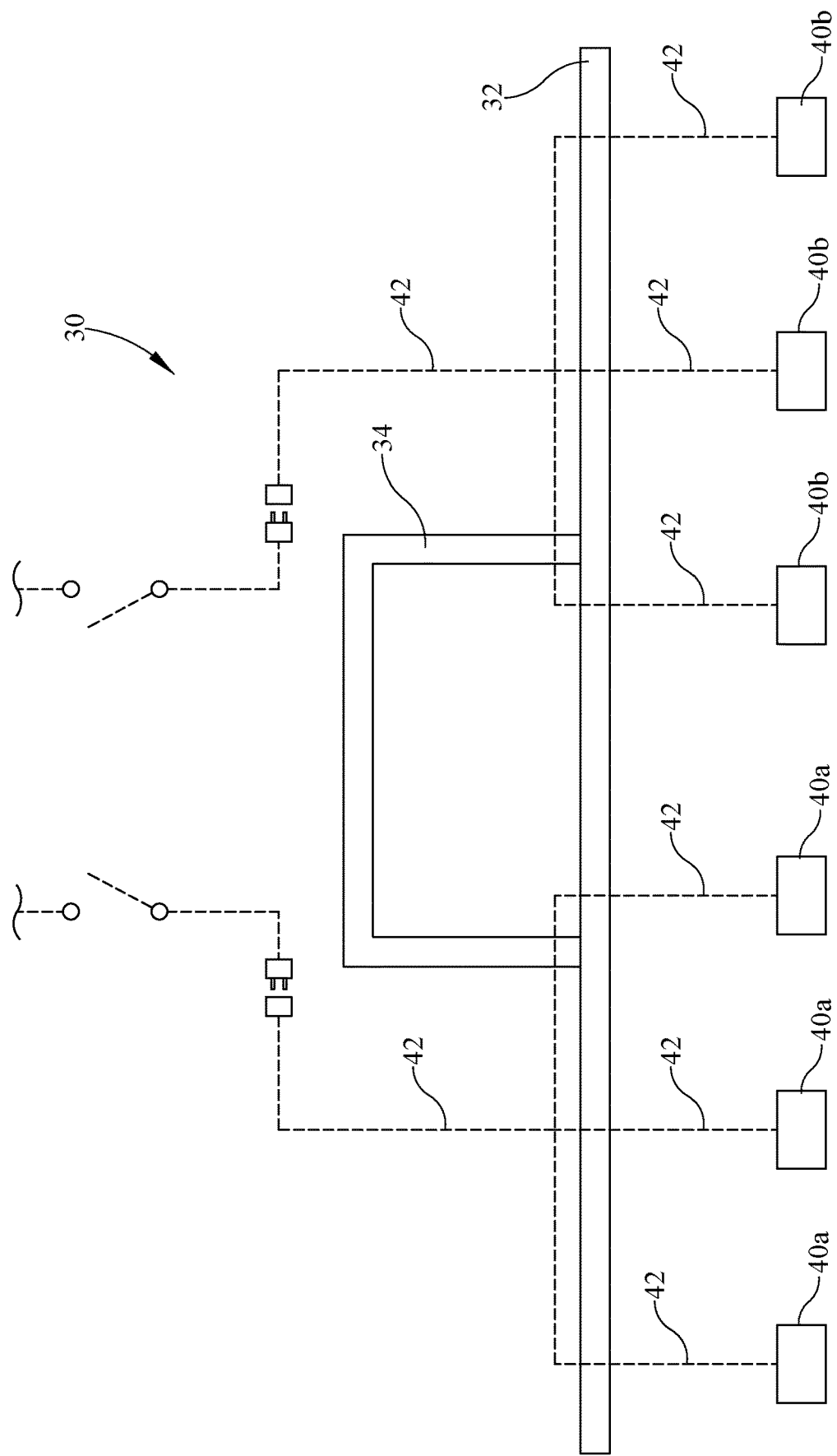
FIG. 9 is a schematic view of the power and/or control system utilized with the tie plate separator.

Also depicted in the instant view, and with reference to FIG. 9, is a schematic view of a power circuit for the separator 30. This system represents a magnetic embodiment, but may also be used for control of pneumatic permanent magnets, hydraulic permanent magnets, battery operated magnets, or other systems which may group magnets in one or more groups to lift or release the tie plates. As previously indicated, the magnets 40 may be located on a single circuit or may be located on two or more circuits—electrical, pneumatic or hydraulic. The number of circuits may be dependent upon the loads being lifted and the duty cycle of the magnets. The closer the duty cycle to the load limit of the magnet, the shorter the duty cycle of the magnet. Accordingly, larger magnets may be utilized to provide a longer duty cycle with higher magnetic force capability but this comes at a financial cost. Alternatively, shorter duty cycles may be utilized which utilize generally less expensive magnets, however, it may be desirable to provide two or more circuits so that one circuit of magnets is cooling while the other is working to pick tie plates. These circuits may be alternated during a work period to meet the need of the work schedule and the time being worked and the number of tie plates being picked.

In the instant embodiment, two electrical conduits are shown extending to one portion or group of magnets 40*a* while a second wire is shown extending to a second group of magnets 40*b*. The magnets 40 (collectively) are shown connected to squiggly lines which schematically represent electrical conduit. The magnets 40*a* are shown on one side of the bar 32 and define while the magnets 40*b* are shown on the second side. However, in alternate embodiments, the magnets 40*a*, 40*b* may be alternated in arrangement to provide improved weight distribution. Also, while two circuits are shown, additional numbers of circuits may be provided, or a single circuit may be utilized. Each of these wires may lead back to a switch or other controller in a cab 17 or an operator location for the crane or boom, so that an operator may turn one circuit on while the other is off or vice versa. Again, while two switches are shown, it may also be the case that a single switch is utilized with all of the magnets on such circuit.

In the embodiments described, the magnets 40 have been described generally as electromagnets. However, in other embodiments, it may be possible to use permanent magnets. In those instances, the magnets will always be capable of retaining the tie plates 16. This would require some additional structure to allow for release of the tie plates. For example, a pneumatic actuator may be used to extend and retract the magnet. The magnet 40 may be extended to retain the tie plate 16, then the actuator retracted causing the tie plate to engage some adjacent structure and knock or pry off the tie plate 16 form the permanent magnet. A similar system may be utilized in a hydraulic form instead of the pneumatic. Further, it may be possible to control the actuation in groups as described and shown relative to FIG. 9. However, this is not a necessity.

Figure 10:
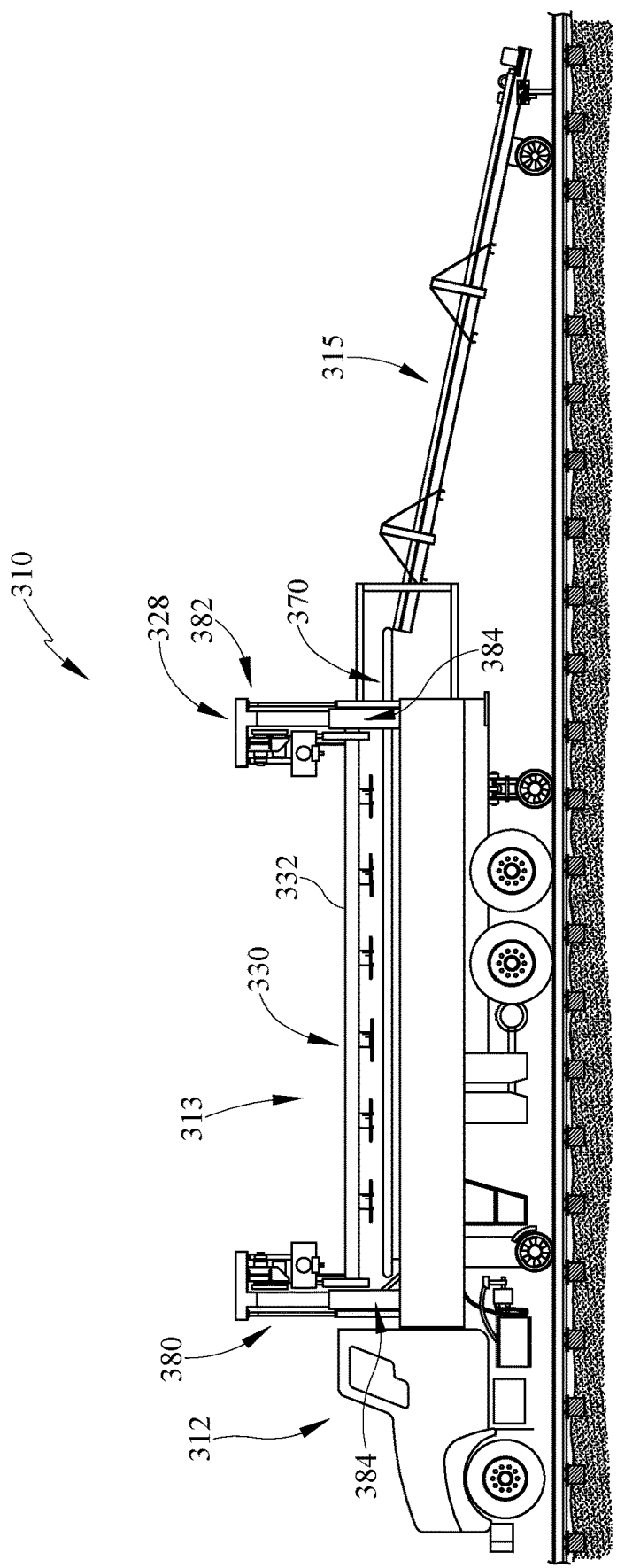
FIG. 10 a side view of an alternate tie plate separator and tie plate distribution system.

Referring now to FIG. 10, a side view of an alternate embodiment of the tie plate separator system is provided. According to the following embodiments, the cantilevered crane is replaced with a gantry crane type system to raise and lower the magnetic bar 332 of the tie plate separator 330. The separator 330 picks up tie plates from one or more piles and deposits them on a conveyor 370 for further delivery to additional processing devices. The bar 332 with magnets is supported at ends by a crane, in this embodiment a gantry crane 328, for upward and downward movement as well as lateral movement about the rail vehicle 312. The term lateral, which is merely description and should not be considered limiting, should be understood to be direction depicted in bold arrows of FIG. 11. However, the lateral direction may change if the orientation of the gantry crane is changed on the vehicle 312. The tie plate separator system 310 and specifically the rail vehicle 312 may comprise a bed area 313 which includes storage compartments 350 (FIG. 11) with tie plates and the conveyor 370 that receives and delivers tie plates to the tie plate distribution system 315. The tie plate conveyor 370 may be located along the center line of the bed 313 of the high rail vehicle 312, or may be offset to one side. In some embodiments, the conveyor 370 may be located generally along the center of the vehicle 312 longitudinal axis and at least one storage compartment 350 (FIG. 11) on at least side of the conveyor 370 also extending in the longitudinal direction of the high rail vehicle 312.

The vehicle 312 is depicted as a self-propelled vehicle and comprises and engine or motor to propel the vehicle along the railroad track and for on-road usage. In the instant figure, the vehicle 312 is depicted as a high-rail vehicle. However, other vehicles may be utilized as will be discussed further herein.

Also disposed in the bed of the vehicle 312 is the tie plate separator 330 which is generally defined by the bar 332 which is moveable by a gantry crane 328. The gantry crane 328 comprises first and second support structures 380, 382. In the instant embodiment, the first support structure 380 is a forward structure and the second support structure 382 is a rear structure relative to the longitudinal direction of the vehicle 312. Each of the support structures 380, 382 are generally n-shaped, when viewed from a rear of the vehicle, having two upright supports and an elevated cross-member.

Figure 11:
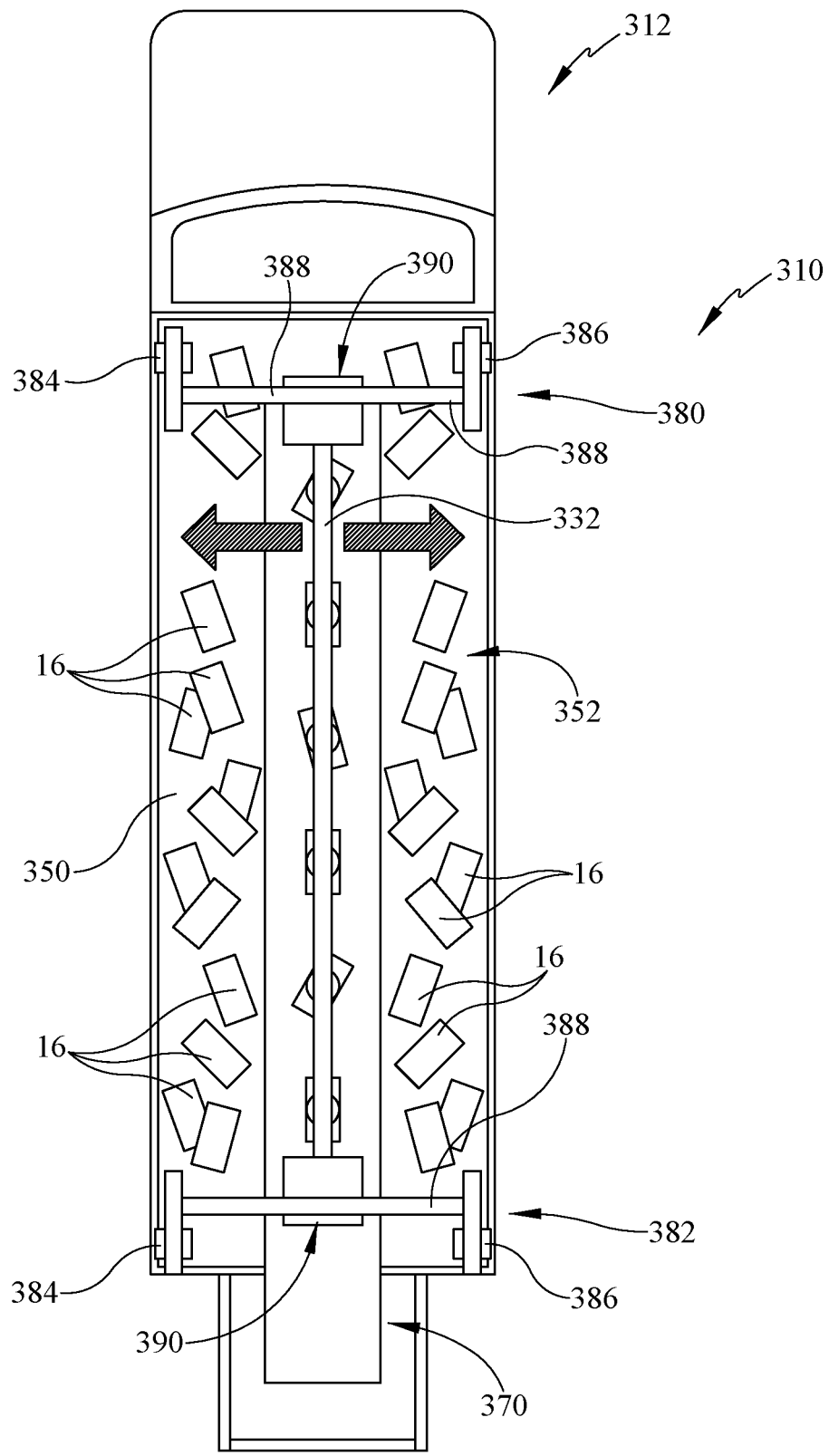
FIG. 11 is a top view of the embodiment of the tie plate separator of FIG. 10.

Referring now to FIG. 11, a top view of the tie plate separator system 310 is shown on the high rail vehicle 312. The tie plate separator system 310 includes the first support structure 380 and the second support structure 382 at forward and rearward respective ends of the vehicle bed. Each support structure 380, 382 may comprise two columns 384, 386 and a cross-member 388.

Disposed on the cross member 388 is a trolley 390 which moves laterally, from side to side, relative to the vehicle 312 longitudinal direction along the cross-member 388. The movement of the trolley 390 on the cross member 388 allows for movement of the bar 332 between the columns 384, 386. The movement of the trolley 390 causes movement of the tie plate separator 330, and specifically the bar 332.

Shown on either side of the bar 332 are tie plate storage compartments 350, 352. The storage compartments 350, 352 allow for placement and storage of tie plates which are to be picked up by the bar 332 and deposited on the conveyor 370 for further movement onto the tie plate distribution system 315 (FIG. 10).

Figure 13:
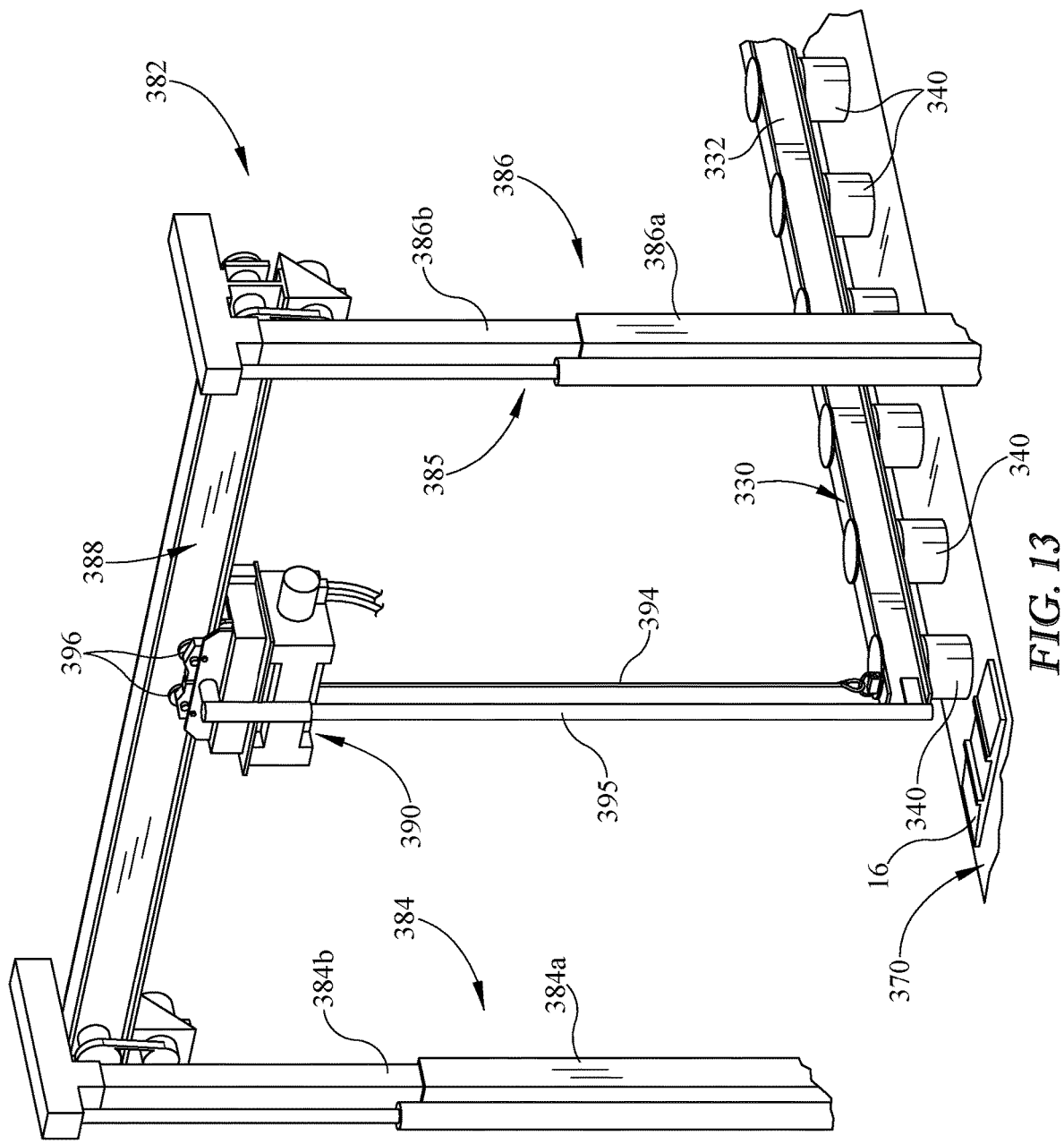
FIG. 13 is a second perspective view of a portion of the crane and bar.

In function, the trolleys 390 move between the vertically extended columns 384, 386 along cross-member 388 to allow the bar 332 to move over the two storage compartments 350, 352. The bar 332 may then be lowered to pick up a plurality of tie plates located in either of the storage compartments 350, 352 and the bar 332 is returned to the center of the vehicle 312 over the conveyor 370. Once positioned over the conveyor 370, the bar 332 is lowered or the magnetic field is cut to drop the tie plates 16 from the storage compartments 350, 352 onto the conveyor 370. Once deposited, the tie plates 16 are separated as previously described via the function of the separator 330 and magnets 340 (FIG. 13).

In order to raise and the lower the bar 332, two embodiments of the lifting functionality are provided. According to one embodiment, the trolley 390 may also comprise a hoist or winch which comprises cables which lift and lower the separator 330. The cables may depend from the hoist and extend or retract therefrom to vary the height of each end of the separator 330. In other embodiments, the support structures 380, 382 may lift and lower the separator 330. For example, and with further reference to FIG. 10, the support structures 380, 382 may comprise a lower collar or sleeve and an arm which extends therefrom and may move telescopically into or out of lower collar or sleeve. As a result, the height of the support structures 380, 382 may vary and a fixed connection of the bar 332 may therefore lift or lower the bar 332. In other embodiments, a combination of movable support structures 380, 382 and the trolley 390 with hoist or winch may be utilized. Other structures may also be utilized to raise and lower the separator 330.

Figure 12:
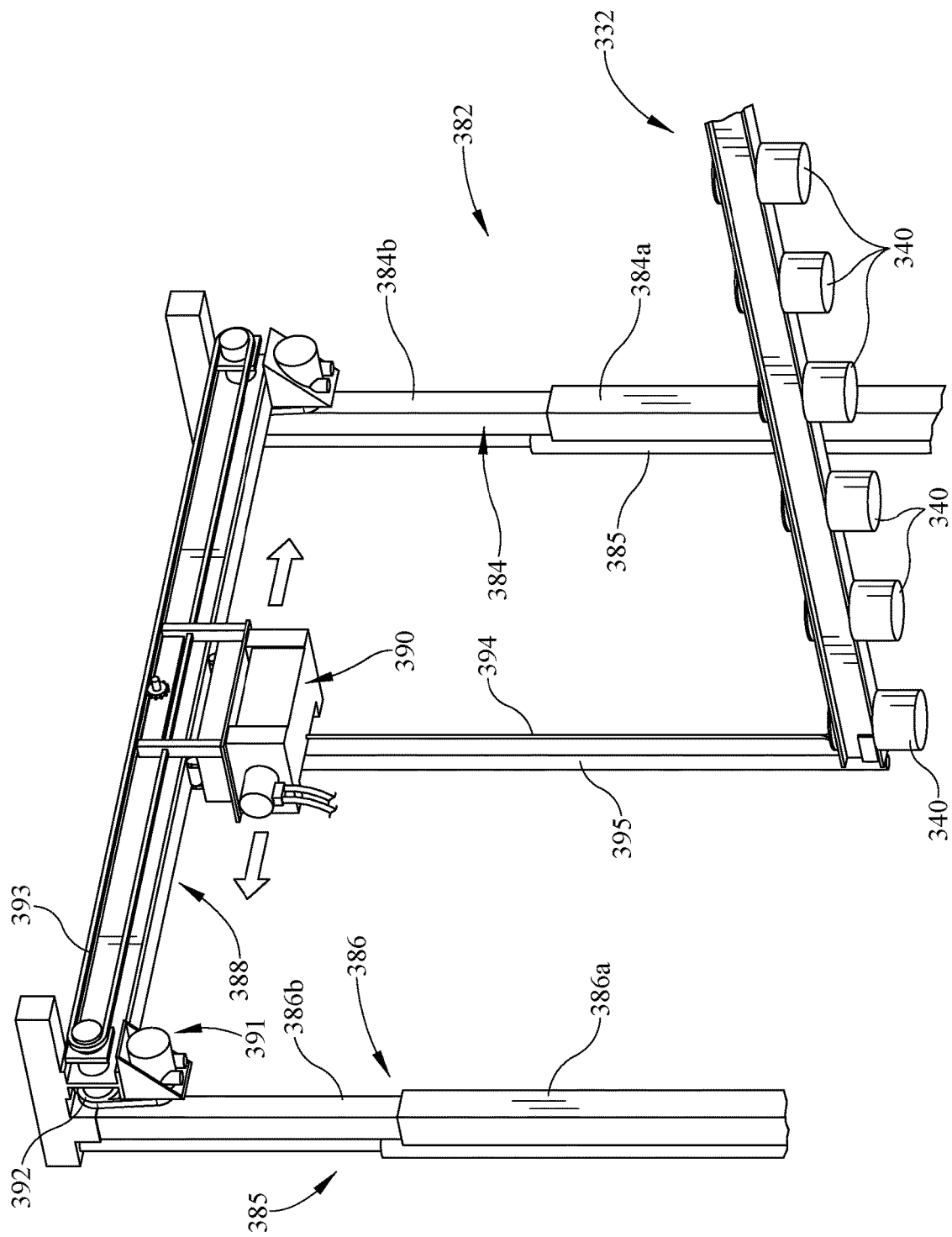
FIG. 12 is a perspective view of a portion of the crane and bar.

Referring now to FIG. 12, the second support structure 382 is shown in perspective view. The support structure 382 is removed from the rail vehicle for clarity of description. In the depicted example, the support structures 380, 382 comprise columns 384, 386 which provide the lifting and lowering of the separator 330. In this embodiment, the columns 384, 386 each have a collar and slidable arm arrangement. The columns 384, 386 may each comprise a lower sleeve or collar 384*a*, 386*a* and an arm 384*b*, 386*b*. The columns 384, 386 may each be actuated by a fluid actuator 385 to adjust the height of the arms 384*b*, 386*b*. The fluid actuator 385 may be, for non-limiting example, a hydraulic actuator or a pneumatic actuator. Other actuators may be utilized, including, but not limited to, linear actuators.

Located on the cross member 388 is the trolley 390. The trolley 390 moves laterally across the cross member 388 and may be driven by motor and drive arrangement, for example gear drive, chain drive, geared transmission, other transmissions, or combinations of any. In the example, a hydraulic motor 391 is utilized and connected to a drive 392 which allows movement of a chain 393 to guide the trolley 390 to move back and forth across the cross member 388. With two of these trolleys 390, the bar may be moved laterally over the rear of the high rail vehicle 312.

Referring now to FIG. 13, a rear perspective view of the support 382, shown in FIG. 12, is provide. Specifically, the view more clearly depicts the cross-member 388 and the trolley 390, which moves along the cross member 388. The trolley 390 also comprises an anti-sway post 395 depending from the trolley 390. The trolley 390 may comprise a cable 394 which connects to the bar 332. The anti-sway post 395 inhibits or limits uncontrolled sway of the bar 332 due to movement of the trolley 390. Thus, the anti-sway post 395 may either provide sole connection for the separator 330 or the cable 394 may provide a sole connection, or alternatively the cable 394 may be a backup support for the anti-sway post 395 to support the separator 330.

Also in this view, trolley wheels 396 are shown riding along the flange of the cross member 388. Various structures may be utilized to support this movement but in the instant embodiment, a wheel system is utilized to support the trolley and motion along the flange of the cross member 388 to provide lateral movement of the bar 332.

Referring still to FIG. 13, a lower portion of the figure depicts the separator 330 and magnets 340 connected thereto. The magnets 340 may be fixed to the bar 332 or may hang from the bar 332 so as to have some freedom of motion relative to the separator 330. In the depicted embodiment, the separator 330 is positioned over the conveyor 370 for depositing, or pick up, of tie plates 16 onto the conveyor 370.

One skilled in the art should recognize from this description that while the tie plate separator system 310 is shown on a high rail vehicle 312, such system may also be mounted to a flatbed rail car as shown in FIG. 2 or alternatively, may be placed in a form within a gondola car as described in FIG. 3.

Figure 14:
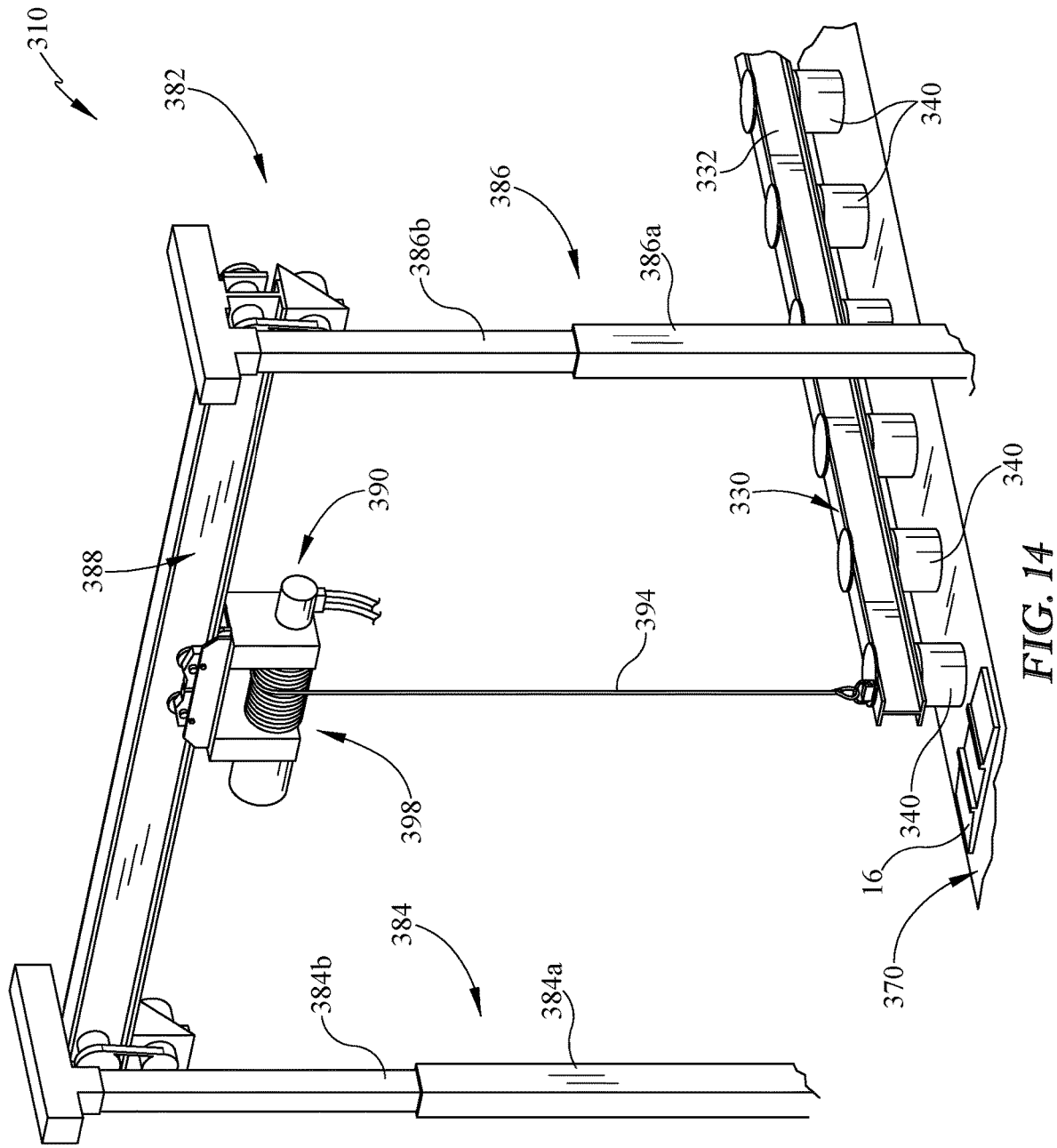
FIG. 14 is rear perspective view of a portion of an alternate embodiment of a crane and bar.
Figure 15:
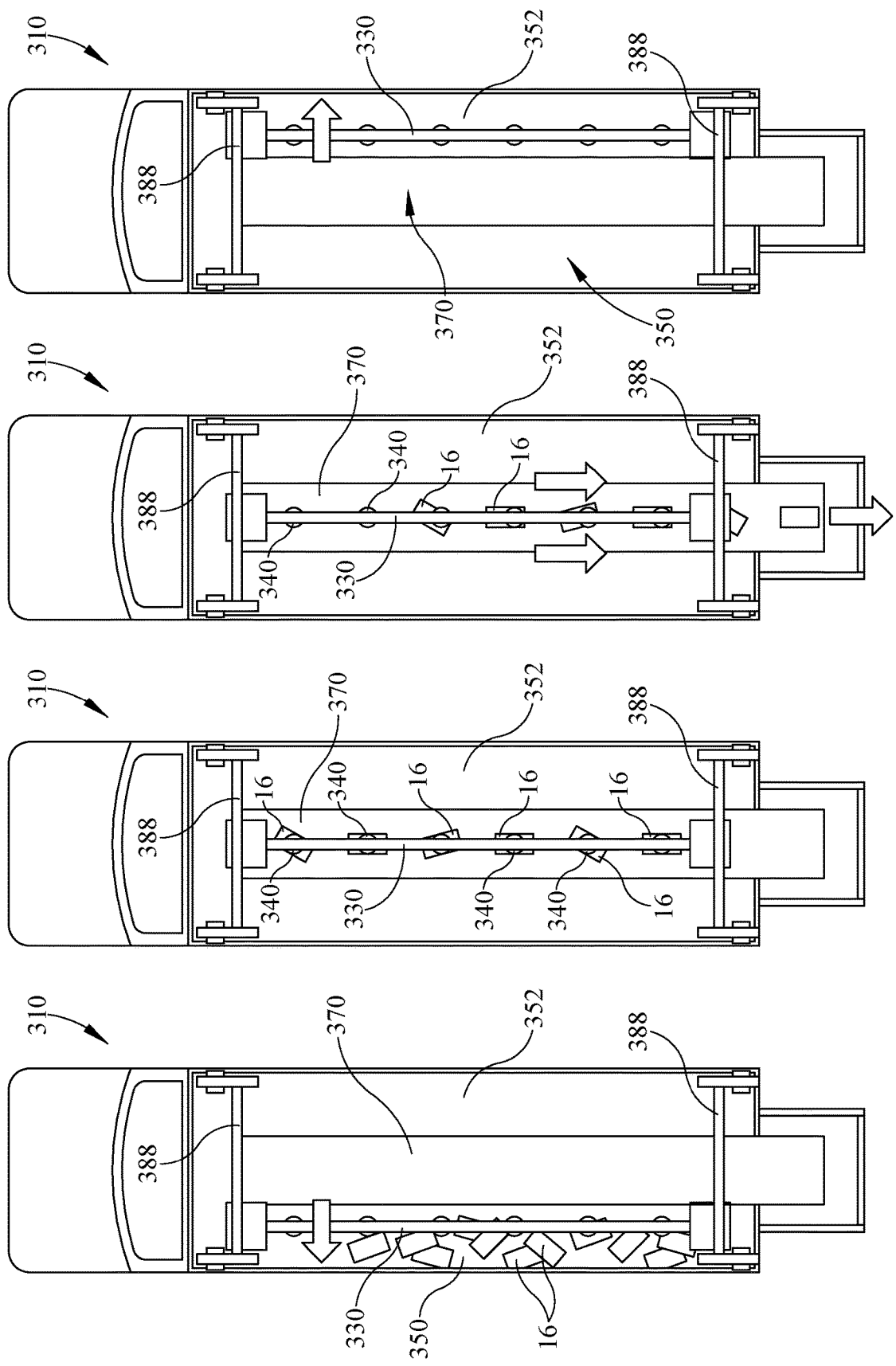
FIGS. 15a-15d is a sequence of views depicting operation of the crane and bar for separation of the tie plates.

With reference now to FIG. 14, an alternate embodiment of the tie plate separator system 310 is depicted which utilizes a hoist or winch 398 in combination with the trolley 390 to raise and lower the bar 332. In this embodiment, the columns 384, 386 are shown to be movable in some embodiments, but may also be fixed, for example a one-piece structure. The columns 384, 386 may be fixed because the separator 330 is lifted and lowered in a different manner, or the columns 384, 386 may be movable as shown and previously described, or the two functionalities may be combined.

In this embodiment, the trolley 390 may have the additional function of lifting and lowering the separator 330 by way of a cable 394, in combination with a hoist or winch 398. The trolley 390 and hoist 398 may be used at both end supports 380, 382 of the crane in order to raise and lower the separator 330. The cable 394 may be used alone, or may be used in combination with the anti-sway bar 395 (FIG. 13). This will limit uncontrolled movement of the separator 330. The anti-sway bar 395 may extend between the trolley 390 and the bar 332.

Referring now to FIGS. 15*a* thru 15*d*, a plurality of sequence views are shown of the movement of the separator 330 by the gantry crane 328 in order to retain a plurality of tie plates 16 from a pile and singulate or separate the tie plates 16 before depositing such on the conveyor 370. Referring first to FIG. 15*a*, the separator 330 is shown positioned over one of the storage compartments 350. The bar 332 is in a lowered orientation so that the magnets 340 can retain single tie plates 16 from the pile of tie plates 16 within the storage compartment 350.

Referring now to FIG. 15*b*, the separator 330 is raised relative to its previous position and the singulated tie plates 16 are retained by the magnets 40 and moved from the pile over the conveyor 370. Depending on the height of the raise, the bar 332 may need to be lowered closer to the conveyor 370 or the height at which the bar 332 is raised may be only enough to clear the conveyor 370 such that further lowering is not necessary. However, with reference to FIG. 15*c*, the magnets 340 release the tie plates 16 from the bar 332 unto the conveyor 370. The tie plates are separated and each magnet 340 only has a single tie plate so that single tie plates are deposited in a more orderly fashion onto the conveyor 370. The conveyor 370 is shown moving rearwardly by the double line arrows. Next the bar 332 may be moved to either of the storage compartments 350, 352 and lowered to grasp more tie plates from the pile of tie plates therein. This process may continue by moving the bar 332 back over the conveyor 370 and either releasing, or lowering and releasing tie plates onto the conveyor 370. As previously described, the magnets 340 may be formed so that each magnet 340 is used in each cycle or so that magnet usage is alternated in order to preclude overheating and loss of magnetic force.

Figure 16:
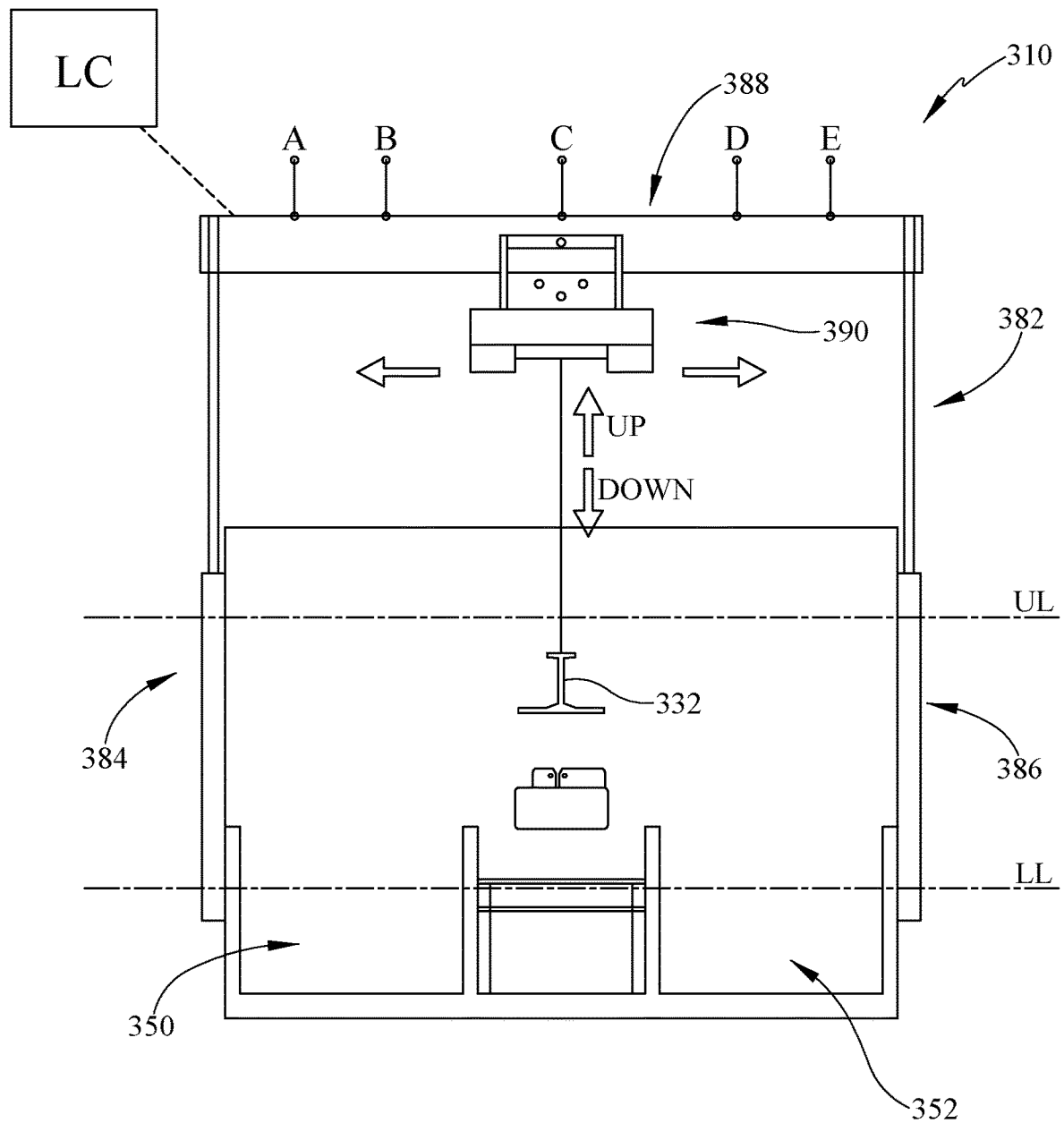
FIG. 16 is a rear view of an example embodiment which more clearly depicts motion during a method of use; and, FIG. 17 is a flow chart describing an example method.

With reference now to FIG. 16, an end view of an example separator 310 or singualtor is provided. The support 382 is shown with the member 388 extending in a lateral direction and between vertical supports. The trolley 390 is shown centrally located on the support 388 and is capable of moving in the lateral directions, left and right, in the depicted example. The trolley 390 may include a winch to raise and lower the bar 332, or the support 382 may be height adjustable as previously described. The conveyor is disposed beneath the bar 332 to receive tie plates and move them to an alternate location.

Along the upper portion of the member 388 are noted locations A-E, also referred to as setpoints. The setpoints A and E may be, for example, stop points for the trolley in order to retrieve tie plates from the storage compartments 350, 352. Likewise, setpoints B and D may also be stop points to pick up tie plates with the bar 332. Thus, for example, one or more locations may be utilized to more thoroughly retrieve tie plates within the storage compartments 350,352. Setpoint C may, for example, be a start/stop point. The figure also provides arrows representing left/right movement and up/down movement of the bar 332.

For understanding of the operation, the following description is provided of the sensors and movements of the components of the system. The gantry crane comprises various sensors to communicate positions of the tie plate bar 332 to a logic controller LC. These sensors may be used to detect three characteristics. The sensors may provide: (i) the lateral position of the trolley 390, (ii) an upper limit UL of the tie plate bar 332, and (iii) a lower limit LL of the tie plate bar 332. The upper limit UL is used to stop raising of the tie plate bar 332 beyond a preselected upper height limit. The lower limit LL is used to stop the lowering of said tie plate bar 332 beyond a preselected lower height limit.

The lateral position sensor determines the location of the trolley in the lateral dimension. That is perpendicular to the forward—rearward direction of the vehicle in the instant example. The lateral dimension may alternatively be the forward rearward direction of the vehicle, if the gantry crane is oriented 90 degrees to the position shown in the instant, non-limiting example. This arrangement allows the logic controller LC to make a determination of lateral position of the trolley 390, what direction trolley 390 is moving or is to move, and when the trolley 390 needs to stop moving, i.e. reaches a lateral limit position. The sensors may be defined by any of, or a combination of: analog distance sensor, one or more proximity sensors, or one or more limit switches.

The upper limit sensor determines the location of the tie plate bar relative to an upper limit UL. More specifically, the upper limit sensor is used to determine that the magnet bar 332 has made it to the desired upward position. With this information, the logic controller LC can determine that it is safe to move the trolley 390 laterally to its next position without collision between tie plates hanging from magnets and walls or hoppers; which could result in the premature release of tie plates. The sensors may be defined by any of, or a combination of: analog distance sensor, one or more proximity sensors, or one or more limit switches.

The lower limit sensor determines the location of the tie plate bar 332 relative to a lower limit LL. More specifically, the lower limit sensor is used to determine that the tie plate bar 332 reaches a lower limit position, for example when the tie plate bar 332 is resting on the pile of tie plates in one of the compartments 350, 352. This allows the logic controller LC to determine that the downward motion of the magnet bar 332 has reached its maximum and to activate the magnets to power on. The sensors may be defined by any of, or a combination of: analog distance sensor, one or more proximity sensors or one or more limit switches.

Figure 17:
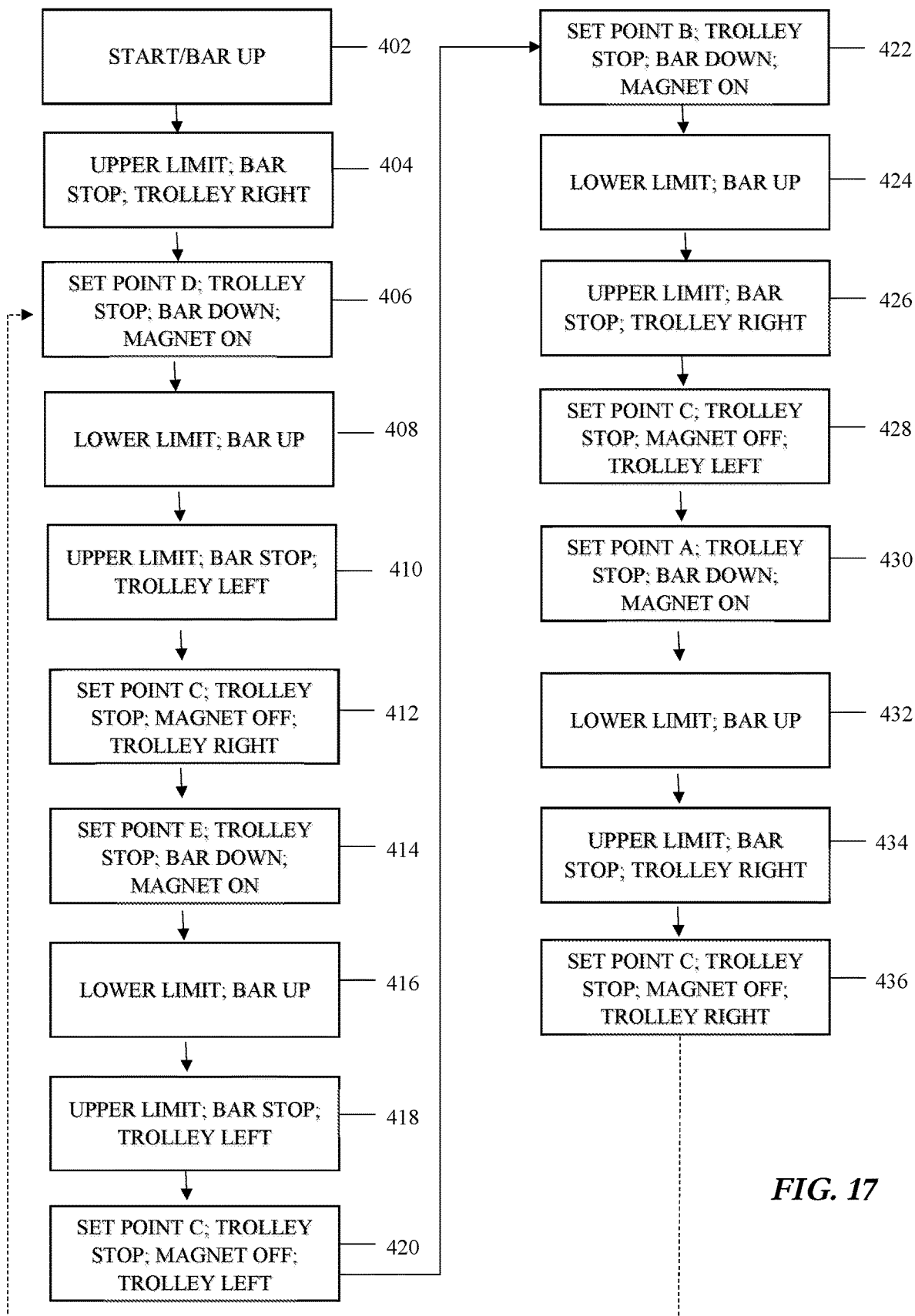

With reference to FIG. 17, a flow chart is provided which depicts the logic and one example method of operation 400. In a first step 402, the trolley 390 may be at location C and the bar 332 is up. In the next step 404, the upper limit UL is confirmed, any movement is of bar elevation is stopped and the trolley 390 moves in one lateral direction, for example right as depicted in FIG. 16. Next at step 406, the trolley 390 moves to set point D and the trolley 390 stops over the storage compartment 352. The bar 332 is moved down and the magnet turns on. At this time, one or more tie plates are picked up.

When the bar 332 reaches a lower limit, the bar 332 reverses and moves up at step 408. Once the bar 332 reaches an upper limit, at step 410, the bar 332 stops and trolley 390 moves laterally, for example left in the embodiment shown in FIG. 16.

At step 412, at location C, the trolley 390 stops and the magnet is turned off, to deposit any tie plates on the conveyor. Afterward, the trolley moves laterally toward location E. Next, at step 414, the trolley is at location E, where the trolley 390 stops and the bar 332 moves down. Additionally, at step 414, the magnet is turned on. At step 416, the bar 332 reaches its lower limit at which time the bar 332 picks up tie plates and the bar 332 begins raising.

Referring now to step 418, the bar 332 reaches an upper limit and the bar 332 stops. At this time, the trolley 390 is moved laterally, for example to the left, toward location C.

At step 420, the trolley 390 stops at location C. The magnet is turned off so that the tie plates are dropped on to the conveyor. After release of the tie plates, the trolley may continue moving, for example to the left toward location B.

At step 422, the trolley 390 is at location B. The trolley 390 stops and the bar 332 lowers. The magnets are on as well in order to pick up tie plates from storage compartment 350. At step 424, the bar 332 is moving down and reaches a lower limit. Subsequently, the bar 332 begins to move upward.

At step 426 the bar 332 reaches an upper limit UL and stops. The trolley 390 moves toward the location C. At step 428, the trolley 390 is at location C and the trolley 390 stops. The magnet is turned off to release the tie plates and the trolley is moved laterally again, toward location A.

At step 430, the trolley 390 is at location A. At step 432, the trolley 390 stops and the bar 332 is lowered, with the magnet on. At this location, over the storage compartment 350, the bar 332 is lowered to pick up tie plates. When the bar 332 reaches a lower limit LL, the bar movement reverses to an upward direction.

At step 434, the bar 332 reaches an upper limit and the bar 332 stops the vertical motion. The trolley 390 begins moving laterally, for example to the right toward location C. Referring now to Step 436, at location, or setpoint C, the trolley 390 stops and the magnet is turned off, dropping tie plates on the conveyor. The trolley 390 next moves toward location D and the method returns to step 406.

It should be clear that this method is merely illustrative of one set of steps, but variations may be utilized which provide a different set of movements, for example to different locations.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the invent of embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

The foregoing description of methods and embodiments has been presented for purposes of illustration. It is not intended to be exhaustive or to limit the invention to the precise steps and/or forms disclosed, and obviously many modifications and variations are possible in light of the above teaching. It is intended that the scope of the invention and all equivalents be defined by the claims appended hereto.

The invention claimed is:

1. A method of sorting tie plates, comprising:
   grasping, with a grappler, a bar having a support structure, said grappler mounted on a utility vehicle, and said grappler and said support structure precluding rotation of said bar;
   activating a plurality of magnets depending from said bar, said bar comprising a plurality of chains depending from said bar, and each magnet of said plurality of magnets disposed at a lower end of each chain of said plurality of chains;
   picking a plurality of tie plates with at least some of said plurality of magnets, said plurality of tie plates being spaced apart by said picking;
   moving said bar over a conveyor wherein said bar is aligned with said conveyor;
   releasing said plurality of tie plates from said at least some of said plurality of magnets on to said conveyor.

2. The method of claim 1, further comprising powering on and off all of said plurality of magnets.

3. The method of claim 2, further comprising at least one power circuit for powering said plurality of magnets.

4. The method of claim 1, further comprising powering on and off a first portion of said plurality of magnets and a second portion of said plurality of magnets, independently.

5. The method of claim 4, further comprising a first power circuit and a second power circuit.

6. The method of claim 5, said first portion of said plurality of magnets operably connected to said first power circuit and said second portion of said plurality of magnets operably connected to said second power circuit.

7. A method of separating tie plates, comprising the steps of:
   providing a vehicle with a boom or arm configured to retain a tie plate bar and preclude rotation of said tie plate bar relative to said boom or arm;
   moving said tie plate bar with said boom or arm;
   lowering said tie plate bar into a tie plate storage container, said tie plate bar having a plurality of chains and a plurality of magnets each disposed at lower ends of said plurality of chains, respectively;
   powering on a magnet circuit to power on said plurality of magnets and retaining a plurality of tie plates in a spaced apart manner;
   moving, with said boom or arm, said tie plate bar over a conveyor;
   un-powering the magnet circuit and releasing said plurality of spaced apart tie plates on to the conveyor.

8. The method of claim 7, wherein the plurality of magnets are electromagnetic and the magnet circuit is electrical.

9. The method of claim 7, wherein the plurality of magnets are permanent magnets.

10. The method of claim 7, said plurality of magnets being spaced apart a distance equal to or greater than a long dimension of a tie plate.

11. The method of claim 7, said tie plate bar sized to fit within a gondola car.

12. The method of claim 7, said vehicle being self-powered or being towable.

13. The method of claim 7, said vehicle being self-propelled or towable.

14. The method of claim 7, said rail vehicle being a hi-rail vehicle.

15. The method of claim 7, said vehicle being a rail car.

16. The method of claim 7, further comprising moving said tie plate bar to the tie plate storage container.

17. The method of claim 7, further comprising moving said released plurality of spaced apart tie plates to a tie plate distribution system along said conveyor.

18. The method of claim 7, further comprising sorting said plurality of tie plates singularly on said conveyor.

19. The method of claim 7, said vehicle being a hi-rail vehicle with a crane having said boom or arm.

20. The method of claim 7, said vehicle being an excavator having said boom or arm.

21. The method of claim 7, said boom or arm having a structure which retains said tie plate bar.

22. The method of claim 21, said structure which retains said tie plate bar being a grappler.

* * * * *